(12) United States Patent
Goenka et al.

(10) Patent No.: US 12,086,800 B2
(45) Date of Patent: Sep. 10, 2024

(54) PERFORMING ENTITY ACTIONS USING EMAIL INTERFACES

(71) Applicant: Oath Inc., New York, NY (US)

(72) Inventors: Mohit Goenka, Santa Clara, CA (US); Ashish Khushal Dharamshi, Sunnyvale, CA (US); Nikita Varma, Milpitas, CA (US); Gnanavel Shanmugam, San Jose, CA (US)

(73) Assignee: Yahoo Assets LLC, New York, NY (US)

( * ) Notice: Subject to any disclaimer, the term of this patent is extended or adjusted under 35 U.S.C. 154(b) by 75 days.

(21) Appl. No.: 16/220,034

(22) Filed: Dec. 14, 2018

(65) Prior Publication Data

US 2020/0193422 A1    Jun. 18, 2020

(51) Int. Cl.
| | |
|---|---|
| G06Q 20/38 | (2012.01) |
| G06F 3/04842 | (2022.01) |
| G06Q 10/0631 | (2023.01) |
| G06Q 10/1093 | (2023.01) |
| H04L 51/046 | (2022.01) |
| H04L 51/42 | (2022.01) |
| H04W 4/24 | (2024.01) |

(52) U.S. Cl.
CPC ....... *G06Q 20/386* (2020.05); *G06F 3/04842* (2013.01); *G06Q 10/06311* (2013.01); *G06Q 10/1097* (2013.01); *H04L 51/046* (2013.01); *H04L 51/42* (2022.05); *H04W 4/24* (2013.01)

(58) Field of Classification Search
CPC ........ H04L 51/046; H04L 51/22; H04W 4/24; G06F 3/04842; G06Q 20/38; G06Q 10/06311; G06Q 10/1097
See application file for complete search history.

(56) References Cited

U.S. PATENT DOCUMENTS 9,313,162 B2 * 4/2016 Kumar ................. G06Q 10/02
10,552,013 B2 * 2/2020 Van Os ............... G06F 3/04842
(Continued)

OTHER PUBLICATIONS

Organizing Received Content Via Email An IP.com Prior Art Database Technical Disclosure Authors et al.: Disclosed Anonymously IP.com No. IPCOM000237038D IP.com Electronic Publication Date: May 28, 2014 (Year: 2014).*

*Primary Examiner* — David P Sharvin
*Assistant Examiner* — Steven R Chism
(74) *Attorney, Agent, or Firm* — Cooper Legal Group LLC

(57) ABSTRACT

One or more computing devices, systems, and/or methods for performing entity actions based upon inputs received via email interfaces are provided. For example, an email received by an email account may be identified. The email may be associated with an entity action corresponding to a first entity. A selectable input corresponding to performing the entity action may be displayed via an email interface associated with the email account. A request to perform the entity action may be received via a selection of the selectable input. Responsive to receiving the request, an action interface corresponding to performing the entity action may be displayed within the email interface. One or more inputs associated with the entity action may be received via the action interface. Responsive to determining that the entity action is completed, a confirmation message, indicative of the entity action being completed, may be displayed using the email interface.

20 Claims, 15 Drawing Sheets

(56) References Cited

U.S. PATENT DOCUMENTS

| | | | |
|---|---|---|---|
| 11,032,220 B2* | 6/2021 | Panchapakesan | H04L 51/046 |
| 2009/0106118 A1* | 4/2009 | Pelegero | G06Q 30/0601 |
| | | | 705/26.1 |
| 2009/0132490 A1* | 5/2009 | Okraglik | H04L 51/22 |
| 2012/0290609 A1* | 11/2012 | Britt | G06F 16/951 |
| | | | 707/769 |
| 2013/0117376 A1* | 5/2013 | Filman | G06Q 10/107 |
| | | | 709/205 |
| 2014/0019561 A1* | 1/2014 | Belity | H04L 51/22 |
| | | | 709/206 |
| 2014/0282016 A1* | 9/2014 | Hosier, Jr. | G06F 3/017 |
| | | | 715/733 |
| 2015/0196838 A1* | 7/2015 | Gough | H04L 51/18 |
| | | | 463/14 |
| 2016/0219003 A1* | 7/2016 | Kumar | H04L 51/046 |
| 2017/0017939 A1* | 1/2017 | Killoran, Jr. | G06Q 20/386 |
| 2017/0201850 A1* | 7/2017 | Raleigh | G06F 3/0482 |
| 2018/0091455 A1* | 3/2018 | Smith | H04L 51/214 |
| 2018/0152461 A1* | 5/2018 | Albisu | H04L 51/12 |
| 2018/0268379 A1* | 9/2018 | Collins | G06Q 10/0838 |
| 2019/0081915 A1* | 3/2019 | Engrav | H04L 51/18 |

* cited by examiner

PERFORMING ENTITY ACTIONS USING EMAIL INTERFACES

BACKGROUND

Many services may transmit emails associated with entity actions (e.g., paying bills associated with a service that an entity provides such as internet services, cable television services, etc.), flight check-ins, etc. For example, a first email account may receive a first email corresponding to paying a bill associated with a first entity (e.g., a company). For example, the first email may be displayed using an email interface associated with the first email account. However, a user associated with the first email account may be required to open a separate window and/or web page in order to transmit a payment associated with the bill.

SUMMARY

In accordance with the present disclosure, one or more computing devices and/or methods are provided. In an example, a first email received by a first email account may be identified. The first email may be transmitted by a second email account associated with a first entity. The first email may be associated with an entity action corresponding to the first entity. A graphical user interface of a first client device may be controlled to display, via an email interface associated with the first email account, a selectable input corresponding to performing the entity action. A request to perform the entity action may be received via a selection of the selectable input. Responsive to receiving the request to perform the entity action, an action interface may be displayed within the email interface. The action interface may correspond to performing the entity action. One or more inputs associated with the entity action may be received via the action interface.

In an example, a first message received by a first client device associated with a first user account may be identified. The first message may be transmitted by a second client device associated with a first entity. The first message may be associated with an entity action corresponding to the first entity. A graphical user interface of the first client device may be controlled to display, via a communication interface associated with the first user account, a selectable input corresponding to performing the entity action. A request to perform the entity action may be received via a selection of the selectable input. Responsive to receiving the request to perform the entity action, an action interface may be displayed within the communication interface. The action interface may correspond to performing the entity action. One or more inputs associated with the entity action may be received via the action interface.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
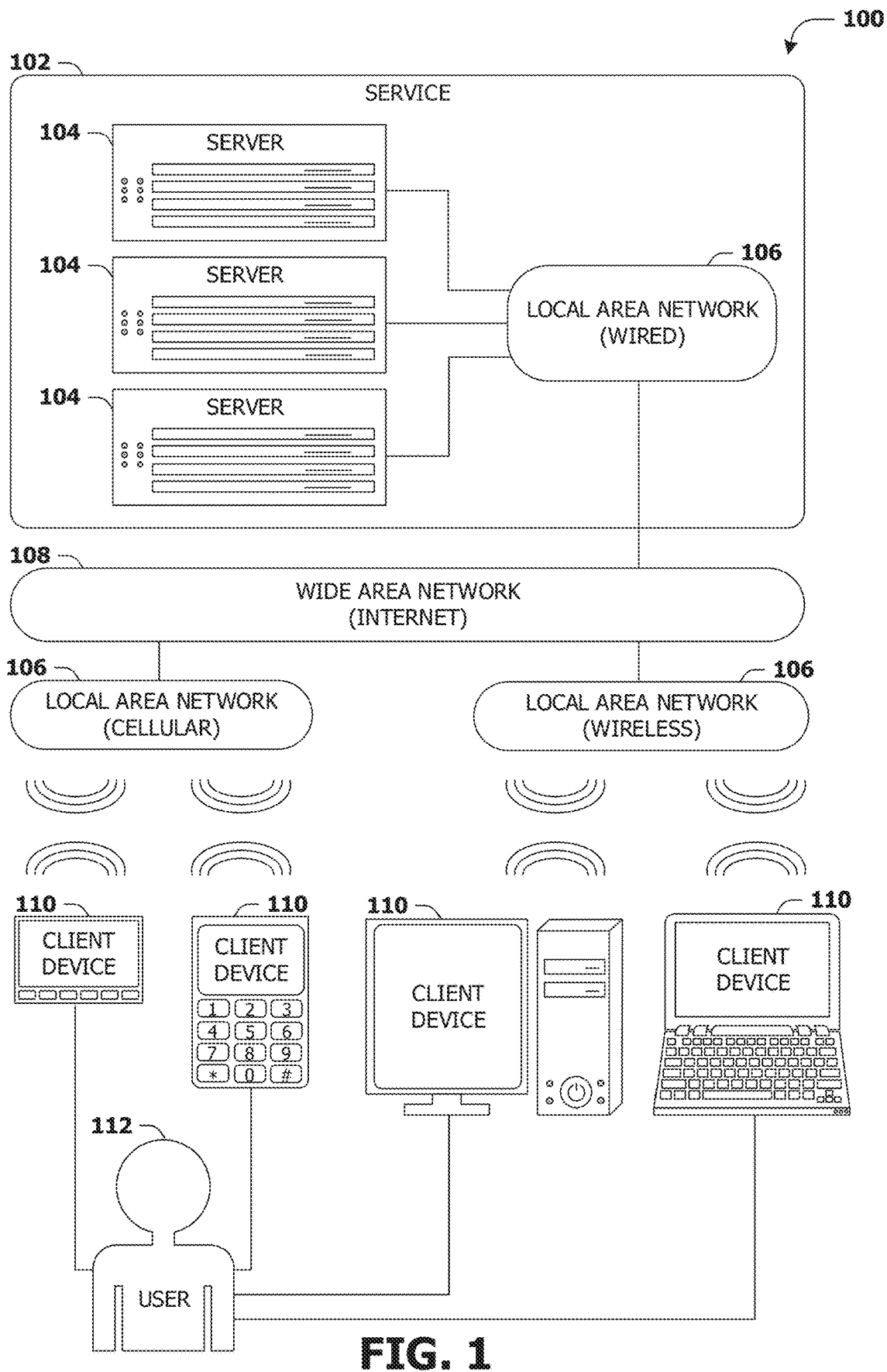
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
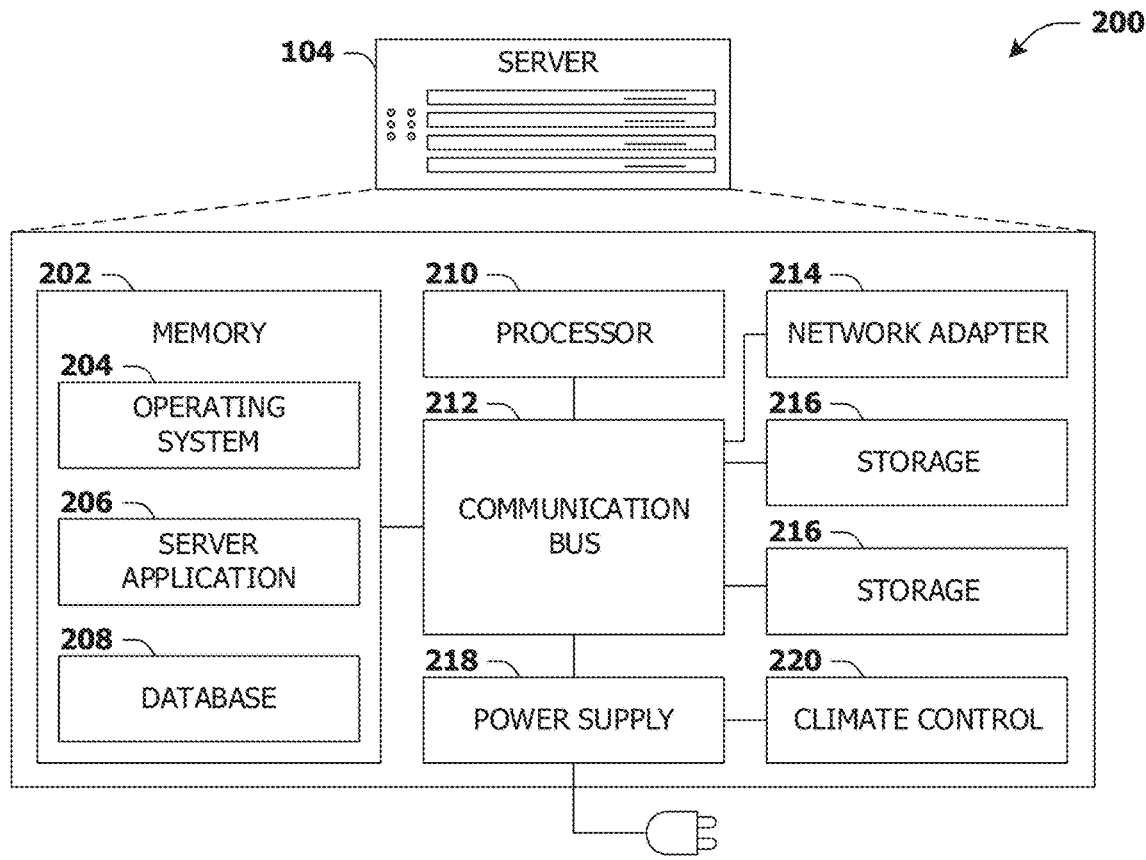
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
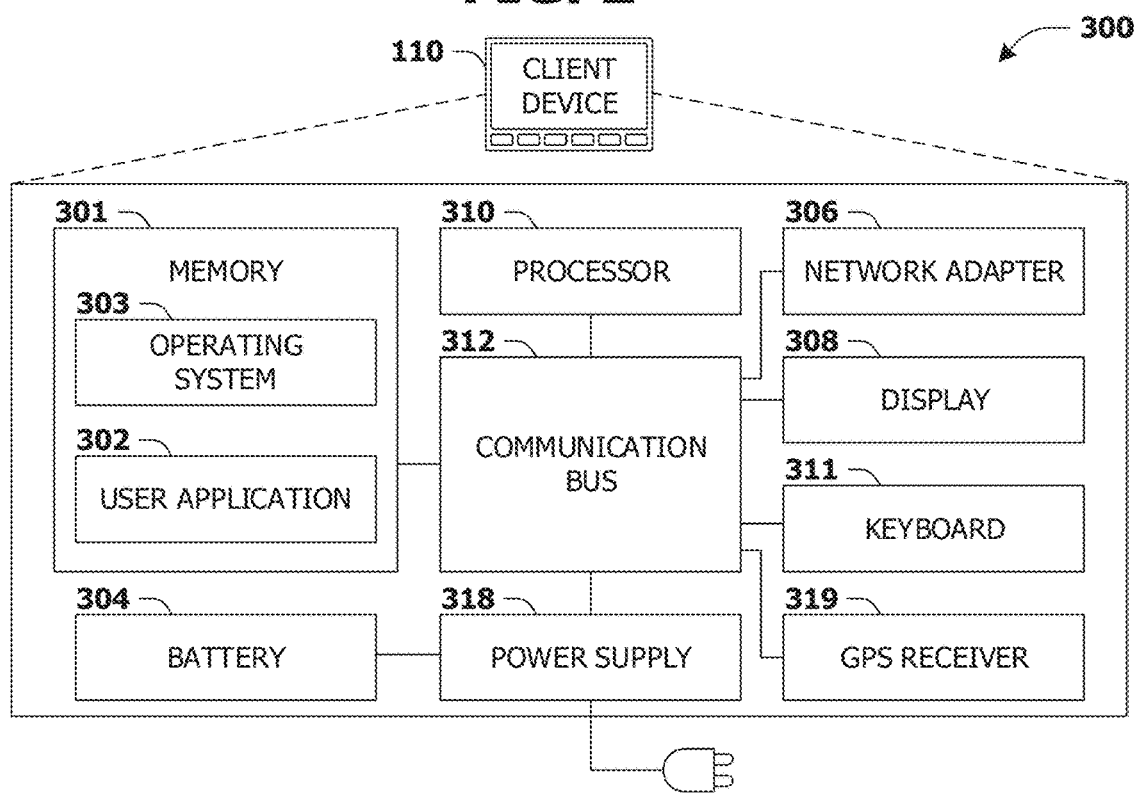
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for performing entity actions based upon inputs received via email interfaces are provided. For example, a user (and/or a client device associated with the user) may access and/or interact with a communication system (and/or an email system, messaging system, etc.) for sending and/or receiving emails and/or performing communications via messaging, voice calls, video calls, etc. Emails, serving as notifications for transferring payments (and/or serving as notifications for performing other entity actions, such as performing flight check-ins, tracking packages, etc.), may be transmitted to an email account associated with the user. For example, the user may open a first email associated with a first entity action (e.g., transferring a payment in exchange for services of a first entity, performing a flight check-in, etc.) using an email interface on the client device. However, in order to perform the first entity action (e.g., transfer a payment, perform a flight check-in, etc.), the user may need to open a separate application and/or browser to navigate to a web page associated with the first entity, which may be a difficult and/or a time-consuming process for the user.

In accordance with one or more of the techniques presented herein, a second email may be received by the email account. The second email may be associated with a second entity action (e.g., paying a bill) corresponding to a second entity (e.g., an internet service provider providing internet services for the user). A selectable input (e.g., a selectable graphical object) corresponding to performing the second entity action may be displayed (within the email interface and/or within the second email) (e.g., the selectable input may comprise an indication of the second entity action (e.g., "Pay Bill Here")). A request to perform the second entity action may be received via a selection of the selectable input. An action interface corresponding to performing the entity action may be displayed within the email interface, such that the user may not need to open a separate application and/or browser in order to perform the second entity action (e.g., the user may not be directed to a web page associated with the second entity in order to perform the second entity action).

Figure 4:
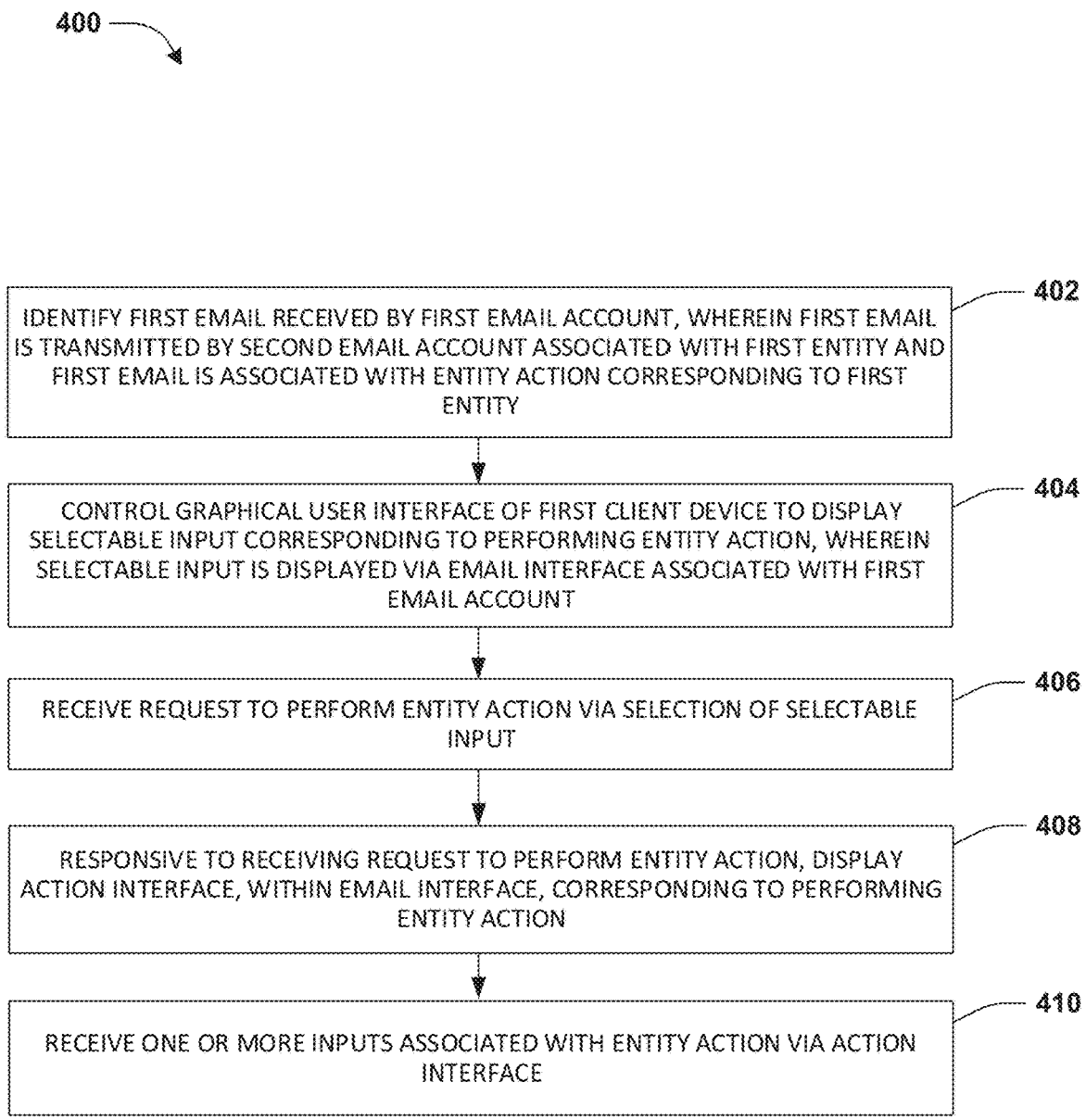
FIG. 4 is a flow chart illustrating an example method for performing entity actions based upon inputs received via email interfaces.

An embodiment of performing entity actions based upon inputs received via email interfaces is illustrated by an example method 400 of FIG. 4. A first user, such as user Jill, and/or a first client device associated with the first user may access and/or interact with a communication system (and/or an email system, messaging system, etc.) for sending and/or receiving emails and/or performing communications via messaging, voice calls, video calls, etc. For example, a first email account (and/or a different type of user account, such as a messaging user account, a social media user account, etc.) of the first user with the communication system may be accessed and/or interacted with via a first email interface, such as an email client, a web email interface accessed via a browser, an email application, etc. on the first client device. In some examples, the communication system (and/or the first email interface) may be associated with an email service provider.

In some examples, the communication system may identify emails associated with entity actions (e.g., transferring payments, performing flight check-in, etc.). For example, the emails associated with the entity actions may be identified by analyzing the emails to identify key words (e.g., bill, payment, invoice, flight, check-in, etc.) within the emails, wherein the key words may be related to entity actions. Using one or more of the techniques presented herein, the communication system may enable users to perform the entity actions using email interfaces associated with the communication system.

At 402, a first email received by the first email account may be identified. For example, the first email may be transmitted by a second email account associated with a first entity (e.g., a company, a business, an organization, a government agency, etc.). The first email may be associated with a first entity action corresponding to the first entity.

In a first example, the first email may comprise a bill for services (e.g., an electronic bill for services associated with an electronic bill payment) and/or the first entity may be a service provider (e.g., a gas providing company, an electricity providing company, a water providing company, an internet service provider, a cell phone service provider, a cable television provider, a paper company providing paper to various businesses, a public utility, etc.). The bill for services may correspond to a request for payment in exchange for services and/or products provided by the first entity (e.g., cell phone service, internet service, landscaping service, providing electricity to a property, providing water to a property, providing gas to a property, providing paper to a property, providing equipment to a property, etc.). For example, the first email may serve as a notification for transferring a payment (e.g., a payment in exchange for services). The first entity action (associated with the first email) may correspond to transferring the payment to an account (e.g., a bank account) associated with the first entity in exchange for services.

In a second example, the first email may comprise indications of one or more products that the first user associated with the first email account added to a shopping cart of an internet shopping interface associated with the first entity (e.g., an internet store). For example, the first email may serve as a reminder for the first user to complete an internet order (associated with the one or more products added to the shopping cart) and/or transfer a payment to purchase the one or more products. The first entity action may correspond to transferring the payment to an account associated with the first entity and/or entering shipping information (and/or other order information, such as contact information, first name and/or last name of the first user, shipping mode (e.g., priority, first class, etc.), etc.) in order to complete the internet order and/or purchase the one or more products.

In a third example, the first email may comprise tax payment information associated with the first user and/or the first entity may be a government agency (e.g., a city level government agency, a state level government agency, a federal level government agency, etc.). For example, the first email may serve as a notification for transferring a payment (e.g., local tax payment, state tax payment, federal tax payment, etc.) for tax purposes (e.g., income tax, property tax, etc.). The first entity action may correspond to transferring the payment to an account associated with the first entity.

In a fourth example, the first email may be associated with a flight check-in and/or the first entity may be an airline company. For example, the first email may be associated with a request to confirm a flight reserved by the first user (e.g., confirm that the first user and/or a different user associated with the first email account is planning to be on the flight). The first entity action may correspond to entering personal information and/or flight information to confirm the flight and/or retrieving a boarding pass for use when boarding a plane.

In a fifth example, the first email may be associated with tracking information corresponding to a package being shipped to a location and/or the first entity may be a shipping company. For example, the first entity action may correspond to determining an estimated time of arrival associated with the package being shipped to the location and/or choosing a time for delivery of the package (e.g., a preferred time for delivery that suits a schedule of the first user).

In some examples, a request to access the first email account may be received from the first client device. For example, the request to access the first email account may be received responsive to the first email interface being opened using the first client device (e.g., the first email interface may be opened by selecting an icon corresponding to the first email interface, by navigating to a web page associated with the first email interface using a browser, etc.). Alternatively and/or additionally, the request to access the first email account may be associated with logging into the first email account using the first email interface (e.g., the request to access the first email account may be received in association with receiving login information, such as a password, a first email address associated with the first email account, etc.).

In some examples, responsive to receiving the request to access the first email account, the first email interface may be displayed. For example, an inbox comprising a list of emails received by the first email account may be displayed using the first email interface. Alternatively and/or additionally, one or more selectable inputs (e.g., selectable inputs corresponding to settings associated with the first email account, selectable inputs corresponding to email actions, etc.) may be displayed.

At 404, a graphical user interface of the first client device may be controlled to display a first selectable input corresponding to performing the first entity action. For example, the first selectable input may be displayed using the first email interface associated with the first email account. In some examples, the first selectable input may be a (selectable) graphical object (e.g., a button comprising a label) indicative of the first entity action. In the first example (where the first email comprises the bill for services), the first selectable input may comprise a label "Pay Bill Here". In the fourth example (associated with the flight check-in), the first selectable input may comprise a label "Flight Check-in".

In some examples, the first selectable input may be displayed within the list of emails (e.g., the inbox of the first email account). The first selectable input may be displayed in association with a first list item of the list of emails. The first list item may correspond to the first email (e.g., the first list item may comprise a subject associated with the first email, a time associated with the first email, a sender name associated with the first email, and/or a portion of text of an email body of the first email). Responsive to a selection of the first list item, the first email may be opened and/or the first email may be displayed using the first email interface.

The first selectable input may be displayed within the first list item. For example, the first selectable input may be displayed on a first location of the first list item. Alternatively and/or additionally, the first selectable input may be displayed adjacent to the first list item. For example, the first selectable input may be displayed on a right side of the first list item and/or a left side of the first list item.

In some examples, responsive to receiving the request to access the first email account from the first client device, a first verification process corresponding to the first email action may be performed to verify that the first user associated with the first email account is authorized to perform the first entity action. The first verification process may be performed using a first server associated with the first entity and/or a second server associated with the communication system. In some examples, the first verification process may comprise the first server and the second server exchanging tokens and/or performing an authentication exchange (e.g., an authentication handshake).

For example, the second server associated with the communication system may transmit a first verification message to the first server associated with the first entity. The first verification message may comprise a first token used for authentication and/or verification processes. In some examples, the first token may have been (previously) provided by the first server (and/or a different server associated with the first entity) to the second server (and/or a different server associated with the communication system) to be used for authentication and/or verification processes. For example, the first server may transmit an indication of the first token to the second server prior to the second server transmitting the first verification message to the first server. In some examples, updated tokens may be transmitted by the first server to the second server periodically to be used for authentication and/or verification processes. Alternatively and/or additionally, the first verification message may comprise an indication of the first email address associated with the first email account (e.g., the first verification message may comprise the first token and/or the first email address).

Alternatively and/or additionally, the first server (and/or a different server associated with the first entity) may transmit a second verification message to the second server (and/or a different server associated with the first entity). For example, the second verification message may correspond to a verification response associated with the first verification message (e.g., a response to the first verification message). For example, the second verification message may be indicative of the first email account and/or the first user being authorized to perform the first entity action. Alternatively and/or additionally, the second verification message may be indicative of the first email account and/or the first user not being authorized to perform the first entity action.

In some examples, the first selectable input and/or the list of emails may be displayed responsive to receiving the second verification message and/or performing the first verification process. For example, the first selectable input and/or the list of emails may be displayed responsive to a determination that the first email account and/or the first user are authorized to perform the first entity action. Alternatively and/or additionally, responsive to a determination that the first email account and/or the first user are not authorized to perform the first entity action, the list of emails may be displayed and/or the first selectable input may not be displayed (e.g., the list of emails may be displayed without the first selectable input if it is determined that the first email account and/or the first user are not authorized to perform the first entity action).

Alternatively and/or additionally, responsive to a determination that the first email account and/or the first user are authorized to perform the first entity action, the first list item (corresponding to the first email) of the list of emails may be modified to generate a modified version of the first list item. The first selectable input may be included in the modified version of the first list item (e.g., the first list item may be modified to generate the modified version of the first list item by inserting the first selectable input into the first list item). For example, the modified version of the first list item may be included in the list of emails and/or displayed responsive to a determination that the first email account and/or the first user are authorized to perform the first entity action.

In some examples, action information, associated with the first entity action, may be received from the first server (and/or a different server associated with the first entity). In some examples, the action information may be indicative of one or more characteristics of the first entity action. In some examples, the action information may be received during the first verification process (and/or a different verification process). For example, the action information may be included in the second verification message (transmitted by the first server). Alternatively and/or additionally, the action information may be included in a message, different than the second verification message, transmitted by the first server (and/or a different server associated with the first entity) to the second server (and/or a different server associated with the communication system).

In the first example (where the first email comprises the bill for services and/or the first entity is a service provider), the action information may comprise one or more of a first payment amount corresponding to the bill for services, a type of service provided by the first entity (e.g., water, gas, electricity, cell phone, internet, etc.), a name of the first entity (e.g., the service provider), a first due date corresponding to transferring a payment to an account associated with the first entity, one or more late fees associated with not transferring the payment by the first due date, etc.

In the second example (where the first email comprises indications of the one or more products that the first user associated with the first email account added to the shopping cart of the internet shopping interface associated with the first entity), the action information may comprise one or more of a second payment amount corresponding to purchasing the one or more products, a name of the first entity (e.g., an internet store), a time that the one or more products were added to the shopping cart, names of the one or more products, etc.

In the third example (where the first email comprises the tax payment information associated with the first user and/or the first entity may be the government agency), the action information may comprise one or more of a third payment amount corresponding to the tax payment information, a second due date corresponding to transferring a payment to an account associated with the first entity, a name of the first entity (e.g., the government agency), etc.

In the fourth example (where the first email is associated with the flight check-in and/or the first entity is the airline company), the action information may comprise one or more of a time associated with the flight reserved by the first user, a name of the first entity (e.g., the airline company), etc.

In the fifth example, (where the first email is associated with the tracking information corresponding to the package being shipped to the location and/or the first entity is a shipping company), the action information may comprise one or more of the estimated time of arrival of the package, a description of the package, a destination location, etc.

In some examples, a first action message may be generated based upon the action information. For example, the first action message may be indicative of the action information. The first action message may comprise merely a portion of the action information. In some examples, the first action message may comprise text serving to inform the first user of one or more (important) details associated with the first entity action. In the first example (where the first email comprises the bill for services and/or the first entity is the service provider), the first action message may comprise the first payment amount corresponding to the bill for services and/or the first due date.

In some examples, the first action message may be displayed in association with the first selectable input. For example, the first action message may be displayed within the first list item. The first action message may be displayed adjacent to the first selectable input. For example, the first action message may be displayed on a second location of the first list item, adjacent to the first location. Alternatively and/or additionally, the first action message may be displayed within the first selectable input.

In some examples, a request to open the first email may be received from the first client device using the first email interface. For example, the request to open the first email may be received responsive to a selection of the first list item, of the list of emails, corresponding to the first email. In some examples, responsive to receiving the request to open the first email, a second verification process corresponding to the first email action may be performed to verify that the first user associated with the first email account is authorized to perform the first entity action.

In some examples, responsive to receiving the request to open the first email, a second selectable input corresponding to performing the first entity action may be displayed. For example, the second selectable input may be displayed within the first email. For example, the second selectable input may be displayed on a third location of the first email. Alternatively and/or additionally, the second selectable input may be displayed adjacent to the first email.

Alternatively and/or additionally, a second action message may be generated based upon the action information. For example, the second action message may be displayed in association with the second selectable input. For example, the second action message may be displayed within the first email. Alternatively and/or additionally, the second action message may be displayed adjacent to the second selectable input. For example, the second action message may be displayed on a fourth location of the first email, adjacent to the third location of the first email. Alternatively and/or additionally, the second selectable input may comprise the second action message.

In some examples, the second verification process may be performed using the first server (and/or a different server associated with the first entity) and/or the second server (and/or a different server associated with the communication system). In some examples, the second verification process may comprise the first server and the second server exchanging tokens and/or performing an authentication exchange (e.g., an authentication handshake).

The second server (and/or a different server associated with the communication system) may transmit a third verification message to the first server (and/or a different server associated with the first entity). The third verification message may comprise a second token (and/or the first token) used for authentication and/or verification processes. Alternatively and/or additionally, the third verification message may comprise an indication of the first email address associated with the first email account. Alternatively and/or additionally, the first server (and/or a different server associated with the first entity) may transmit a fourth verification message (e.g., a verification response) to the second server (and/or a different server associated with the first entity). For example, the fourth verification message may be indicative of the first email account and/or the first user being authorized to perform the first entity action. Alternatively and/or additionally, the fourth verification message may be indicative of the first email account and/or the first user not being authorized to perform the first entity action.

In some examples, the second selectable input, the second action message and/or the first email may be displayed responsive to receiving the fourth verification message and/or performing the second verification process. For example, the second selectable input, the second action message and/or the first email may be displayed responsive to a determination that the first email account and/or the first user are authorized to perform the first entity action. Alternatively and/or additionally, responsive to a determination that the first email account and/or the first user are not authorized to perform the first entity action, the first email may be displayed. Alternatively and/or additionally, responsive to the determination that the first email account and/or the first user are not authorized to perform the first entity action, the second selectable input and/or the second action message may not be displayed.

Alternatively and/or additionally, responsive to a determination that the first email account and/or the first user are authorized to perform the first entity action, the first email may be modified to generate a modified version of the first email. The second selectable input may be included in the modified version of the first email (e.g., the first email may be modified to generate the modified version of the first email by inserting the second selectable input into the first email). Alternatively and/or additionally, the second action message may be included in the modified version of the first email (e.g., the first email may be modified to generate the modified version of the first email by inserting the second action message into the first email). In some examples, the modified version of the first email may be displayed responsive to a determination that the first email account and/or the first user are authorized to perform the first entity action.

At 406, a request to perform the first entity action may be received via the first email interface from the first client device. For example, the request to perform the first entity action may be received via a selection of the first selectable input (e.g., displayed in association with the first list item corresponding to the first email). For example, the request to perform the first entity action may be received responsive to the selection of the first selectable input. Alternatively and/or additionally, the request to perform the first entity action may be received via a selection of the second selectable input (e.g., displayed in association with the first email). For example, the request to perform the first entity action may be received responsive to the selection of the second selectable input.

At 408, responsive to receiving the request to perform the first entity action, an action interface, corresponding to performing the first entity action, may be displayed within the first email interface. In some examples, the action interface may be displayed within the first email. Alternatively and/or additionally, the action interface may be overlaid onto the first email interface. For example, responsive to receiving a selection of the first selectable input, the action interface may be overlaid onto the list of emails of the first email interface. Alternatively and/or additionally, responsive to receiving a selection of the second selectable input, the action interface may be overlaid onto the first email.

In some examples, a third action message may be generated based upon the action information. For example, the third action message may be displayed in association with the action interface. For example, the third action message may be displayed within the action interface. Alternatively and/or additionally, the third action message may be displayed adjacent to the action interface.

In some examples, responsive to receiving the request to perform the first entity action, a third verification process corresponding to the first email action may be performed to verify that the first user associated with the first email account is authorized to perform the first entity action. In some examples, the third verification process may be performed using the first server (and/or a different server associated with the first entity) and/or the second server (and/or a different server associated with the communication system). In some examples, the third verification process may comprise the first server and the second server exchanging tokens and/or performing an authentication exchange (e.g., an authentication handshake).

The second server (and/or a different server associated with the communication system) may transmit a fifth verification message to the first server (and/or a different server associated with the first entity). The fifth verification message may comprise a third token (and/or the first token and/or the second token) used for authentication and/or verification processes. Alternatively and/or additionally, the fifth verification message may comprise an indication of the first email address associated with the first email account. Alternatively and/or additionally, the first server (and/or a different server associated with the first entity) may transmit a sixth verification message (e.g., a verification response) to the second server (and/or a different server associated with the first entity). For example, the sixth verification message may be indicative of the first email account and/or the first user being authorized to perform the first entity action. Alternatively and/or additionally, the sixth verification message may be indicative of the first email account and/or the first user not being authorized to perform the first entity action.

In some examples, the action interface may be displayed responsive to receiving the sixth verification message and/or performing the third verification process. For example, the action interface may be displayed responsive to a determination that the first email account and/or the first user are authorized to perform the first entity action. Alternatively and/or additionally, responsive to a determination that the first email account and/or the first user are not authorized to perform the first entity action, the action interface may not be displayed.

In some examples, merely one of the first verification process, the second verification process and/or the third verification process may be performed. Alternatively and/or additionally, two or more of the first verification process, the second verification process and/or the third verification process may be performed. For example, each of the first verification process, the second verification process and/or the third verification process may be performed.

In some examples, the first verification process, the second verification process and/or the third verification process may be performed based upon authentication guidelines associated with the first entity. For example, the second server (and/or a different server associated with the communication system) may receive instructions associated with the authentication guidelines from the first server (and/or a different server associated with the first entity).

For example, it may be determined (based upon the authentication guidelines) that a fingerprint scan is required in order to verify that the first user is authorized to perform the first entity action. Thus, during the first verification process, the second verification process and/or the third verification process, the first client device may activate a fingerprint scanner of the first client device and/or display instructions associated with the first user placing a finger on the fingerprint scanner. For example, the fingerprint scanner may scan and/or collect a fingerprint of the first user which may be used to determine whether the first user is authorized to perform the first entity action. For example, a representation of the fingerprint may be transmitted to the first server (and/or a different server associated with the first entity). Alternatively and/or additionally, the fingerprint may be compared with a stored fingerprint associated with the first email account. An indication that the fingerprint matches the stored fingerprint (and/or an indication that the fingerprint does not match the stored fingerprint) may be transmitted to the first server (and/or a different server associated with the first entity).

Alternatively and/or additionally, it may be determined (based upon the authentication guidelines) that an eye scan (e.g., a retinal scan, iris recognition, etc.) is required in order to verify that the first user is authorized to perform the first entity action. Thus, during the first verification process, the second verification process and/or the third verification process, the first client device may activate an eye scanner of the first client device and/or display instructions associated with an eye of the first user being scanned by the eye scanner. For example, the eye scanner may scan the eye and/or collect a scan of the eye of the first user which may be used to determine whether the first user is authorized to perform the first entity action. For example, the scan of the eye may be transmitted to the first server (and/or a different server associated with the first entity). Alternatively and/or additionally, the scan of the eye may be compared with stored eye information. An indication that the scan of the eye matches the stored eye information (and/or an indication that the scan of the eye does not match the stored eye information) may be transmitted to the first server (and/or a different server associated with the first entity).

Alternatively and/or additionally, it may be determined (based upon the authentication guidelines) that an audio recording of a voice of the first user is required in order to verify that the first user is authorized to perform the first entity action. Thus, during the first verification process, the second verification process and/or the third verification process, the first client device may activate a microphone of the first client device and/or display instructions associated with the first user speaking into the microphone to collect an audio recording. For example, the audio recording may be used to determine whether the first user is authorized to perform the first entity action. For example, the audio recording may be transmitted to the first server (and/or a different server associated with the first entity). Alternatively and/or additionally, the audio recording may be compared with stored audio indicative of one or more voices associated with the first email account. An indication that the audio recording matches the stored audio (and/or an indication that the audio recording does not match the stored audio) may be transmitted to the first server (and/or a different server associated with the first entity).

Alternatively and/or additionally, responsive to receiving the request to perform the first entity action, the second server (and/or a different server associated with the communication system) may transmit a first notification to the first server (and/or a different server associated with the first entity). For example, the first notification may be indicative of the request to perform the first entity action. For example, the first server (and/or a different server associated with the first entity) may transmit an approval message to the second server (and/or a different server associated with the communication system), where the approval message may grant permission for the first entity action to be performed using the first email interface. In some examples, the action interface may be displayed responsive to a receiving the approval message.

Alternatively and/or additionally, the first server (and/or a different server associated with the first entity) may transmit a rejection message to the second server (and/or a different server associated with the communication system), where the rejection message may not grant permission for the first entity action to be performed using the first email interface. In some examples, responsive to receiving the rejection message, the action interface may not be displayed.

In some examples, the action interface may comprise a set of selectable inputs (e.g., a set of one or more selectable inputs) and/or a set of text fields (e.g., a set of one or more text fields). For example, the set of selectable inputs and/or the set of text fields may correspond to the first entity action. For example, information associated with the first entity action may be inputted and/or received via the action interface using the set of selectable inputs and/or the set of text fields. In some examples, the set of text fields may comprise a text field corresponding to entering a password associated with the first email account and/or a user account of the first user with the first entity.

Alternatively and/or additionally, one or more selectable inputs of the set of selectable inputs may be auto-selected and/or one or more text fields of the set of text fields may be pre-filled. For example, one or more of the action information, the first email, one or more settings associated with the first email account, and/or one or more emails (different than the first email) received and/or transmitted by the first email account, may be analyzed to auto-select the one or more selectable inputs and/or pre-fill the one or more text fields. In an example, if the set of text fields comprises a text field corresponding to a name of the first user, the name of the first user may be determined by analyzing one or more of the first email, the one or more settings associated with the first email account, etc. and/or the text field may be pre-filled using the name of the first user. In a different example, if the set of text fields comprises a text field corresponding to a flight number, the flight number may be determined by analyzing one or more of the first email, the one or more settings associated with the first email account, etc. and/or the text field may be pre-filled using the flight number.

In the first example (where the first email comprises the bill for services and/or the first entity is a service provider), the third action message (displayed in association with the action interface) may comprise the first payment amount corresponding to the bill for services and/or the first due date (and/or other information of the action information). Alternatively and/or additionally, the action interface may comprise one or more of a selectable input corresponding to a form of payment (e.g., electronic, credit card, debit card, electronic check, etc.) that the first user prefers for transferring a payment to an account associated with the first entity, a selectable input corresponding to using a previously used method of payment that the first user previously used to transfer a payment (e.g., last used credit card and/or last used debit card), one or more text fields corresponding to billing information (e.g., credit card number, expiration date, etc.), one or more text fields corresponding to user information associated with the first user and/or the first email account (e.g., name, mailing address, date of birth, etc.), etc.

In the second example (where the first email comprises indications of the one or more products that the first user associated with the first email account added to the shopping cart of the internet shopping interface associated with the first entity), the third action message may comprise the second payment amount corresponding to purchasing the one or more products and/or indications of the one or more products (and/or other information of the action information). Alternatively and/or additionally, the action interface may comprise one or more of a selectable input corresponding to a form of payment that the first user prefers for transferring a payment to an account associated with the first entity, a selectable input corresponding to using a previously used method of payment that the first user previously used to transfer a payment, one or more text fields corresponding to billing information, one or more text fields corresponding to user information associated with the first user and/or the first email account (e.g., name, mailing address, date of birth, etc.), etc.

In the third example (where the first email comprises the tax payment information associated with the first user and/or the first entity may be the government agency), the third action message may comprise the third payment amount and/or the second due date (and/or other information of the action information). Alternatively and/or additionally, the additionally, the action interface may comprise one or more of a selectable input corresponding to a form of payment that the first user prefers for transferring a payment to an account associated with the first entity, a selectable input corresponding to using a previously used method of payment that the first user previously used to transfer a payment, one or more text fields corresponding to billing information, one or more text fields corresponding to user information associated with the first user and/or the first email account (e.g., name, mailing address, date of birth, etc.), etc.

In the fourth example (where the first email is associated with the flight check-in and/or the first entity is the airline company), the third action message may comprise the name of the first entity and/or the time associated with the flight reserved by the user (and/or other information of the action information). Alternatively and/or additionally, the action interface may comprise one or more of a text field corresponding to a confirmation code associated with the first entity action, one or more text fields corresponding to user information associated with the first user and/or the first email account (e.g., name, mailing address, date of birth, etc.), a text field corresponding to a flight number, etc.

In the fifth example (where the first email is associated with the tracking information corresponding to the package being shipped to the location and/or the first entity is a shipping company), the third action message may comprise the estimated time of arrival (and/or other information of the action information). Alternatively and/or additionally, the action interface may comprise a selectable input corresponding to choosing a time for delivery of the package (e.g., that may be convenient for the first user).

At 410, one or more inputs associated with the first entity action may be received via the action interface. For example, the one or more inputs may comprise text inputted into the one or more text fields of the action interface and/or selections of the one or more selectable inputs of the action interface. For example, the action interface may comprise a third selectable input corresponding to transmitting the one or more inputs (e.g., the third selectable input may comprise "Perform Action", "Pay", "Perform Flight Check-in", etc.). For example, responsive to a selection of the third selectable input, the one or more inputs may be received (by the second server) from the first client device.

In some examples, a set of information may be generated based upon the one or more inputs. For example, the set of information may be transmitted to the first server (and/or a different server associated with the first entity). For example, the first entity action may be performed, by one or more servers associated with the first entity, using the set of information. Alternatively and/or additionally, the first entity action may be performed by one or more servers associated with the communication system, using the set of information (and/or the one or more inputs).

In the fourth example (where the first email is associated with the flight check-in and/or the first entity is the airline company), the set of information may comprise one or more of the confirmation code, a name associated with the first user, the flight number, etc. In some examples, the set of information may be transmitted to the first server (and/or a different server associated with the first entity). Alternatively and/or additionally, the first entity action may be performed (e.g., the flight check-in may be performed) using the set of information. Alternatively and/or additionally, a boarding pass may be transmitted by the first server (and/or a different server associated with the first entity) to the second server (and/or a different server associated with the communication system). For example, the boarding pass may be downloaded, printed and/or displayed using the action interface (and/or the first email interface).

In examples where the first entity action is associated with a payment to an account (e.g., a bank account) associated with the first entity, responsive to receiving the one or more inputs, a set of payment information may be generated based upon the one or more inputs and/or the action information. For example, the set of payment information may comprise one or more of a payment amount associated with the payment, a credit card number, an expiration date, account information corresponding to the account associated with the first entity, etc.

The set of payment information may be transmitted to a third server associated with an electronic payment system. For example, the electronic payment system may transfer a payment to the account associated with the first entity responsive to receiving the set of payment information. Alternatively and/or additionally, a payment confirmation may be transmitted, by the third server associated with the electronic payment system, to the second server (and/or a different server associated with the communication system) and/or to the first server (and/or a different server associated with the first entity). The payment confirmation may be indicative of the payment being transferred to the account associated with the first entity. In some examples, the payment confirmation may be transmitted to the first server (and/or a different server associated with the first entity) by the second server (and/or a different server associated with the communication system).

Alternatively and/or additionally, rather than the set of payment information being transmitted to the third server associated with the electronic payment system, the set of payment information may be transmitted to the first server (and/or a different server associated with the first entity). For example, the set of payment information may be used (by one or more servers associated with the first entity) to transfer a payment to the account associated with the first entity. In some examples, a second payment confirmation may be transmitted, by the first server (and/or a different server associated with the first entity) to the second server (and/or a different server associated with the communication system). The second payment confirmation may be indicative of the payment being transferred to the account associated with the first entity.

In some examples, responsive to determining that the first entity action is performed and/or completed, a confirmation message may be displayed using the first email interface. The confirmation message may be displayed using the action interface. In some examples, the confirmation message may be displayed responsive to receiving a notification of completion from the first server (and/or a different server associated with the first entity). Alternatively and/or additionally, the confirmation message may be displayed responsive to receiving the boarding pass, the payment confirmation and/or the second payment confirmation. Alternatively and/or additionally, the confirmation message may be transmitted to the first email account by transmitting an email, comprising the confirmation message, to the first email account.

In some examples, the first selectable input (and/or the second selectable input) may correspond to performing the first entity action automatically. For example, responsive to a selection of the first selectable input, a request to automatically perform the first entity action may be received. Rather than displaying the action interface, the first entity action may be performed (automatically) (e.g., the action interface may not be displayed and/or the first entity action may be performed automatically by the first server associated with the first entity and/or the second server associated with the communication system). For example, responsive to the selection of the first selectable input, the second server (and/or a different server associated with the communication system) may perform the first entity action.

Alternatively and/or additionally, responsive to the selection of the first selectable input, an automatic action message, indicative of the selection of the first selectable input, may be generated. For example, the automatic action message may be transmitted to the first server (and/or a different server associated with the first entity). Upon receiving the automatic action message, the first entity action may be performed by one or more servers associated with the first entity. Alternatively and/or additionally, the first entity action may be performed using existing and/or historical information corresponding to one or more of user information associated with the first email account, previous payments performed using the first email account, previous payments performed using a payment platform associated with the first entity, etc.

Alternatively and/or additionally, a set of information and/or a set of payment information may be generated based upon one or more of the selection of the first selectable input, the action information (e.g., the action information may comprise payment information corresponding to the first user), one or more emails of the first email account, historical information associated with the first email account (e.g., previous instances that payments were made using the email interface), etc.

The set of information and/or the set of payment information may be used to automatically perform the first entity action, such that the first user is required to merely select the first selectable input (and/or the second selectable input) in order to perform the first entity action. Alternatively and/or additionally, the set of information and/or the set of payment information may be transmitted to the first server (and/or a different server associated with the first entity). Responsive to (the first server) receiving the set of information and/or the set of payment information, the first entity action may be performed. Alternatively and/or additionally, the set of payment information may be transmitted to the third server (and/or a different server associated with the electronic payment system). Responsive to (the third server) receiving the set of information and/or the set of payment information, the first entity action may be performed.

It may be appreciated that some techniques may attempt to implement the communication system where selectable inputs corresponding to entity actions associated with emails are displayed. However, those techniques merely navigate users, from email interfaces, to different web pages associated with entities, which may take effort and/or extended periods of time for users to do. By using one or more of the techniques provided herein (e.g., performing verification processes in association with the entities, displaying action interfaces associated with performing the entity actions within email interfaces, pre-filling text fields of the action interfaces and/or auto-selecting selectable inputs of the action interfaces) users may more quickly and/or efficiently perform entity actions without leaving email interfaces.

It may be appreciated that one or more of the techniques presented herein may be implemented using a communication platform different than an email platform (e.g., messaging platforms, browsers, social media platforms, etc.). For example, using one or more of the techniques presented herein, messages associated with entity actions may be identified. Verification processes may be performed in association with entities corresponding to the entity actions and/or selectable inputs corresponding to performing the entity actions may be displayed using communication interfaces (e.g., a selectable input of the selectable inputs may be displayed in association with a message of the messages). Requests to perform entity actions may be received via selections of the selectable inputs and/or action interfaces may be displayed using the communication interfaces. Inputs may be received via the action interfaces and/or the entity actions may be performed using the action interfaces. Confirmation messages may be displayed using the communication interfaces responsive to completion of the entity actions.

FIGS. 5A-5F illustrate examples of a system 501 for performing entity actions based upon inputs received via email interfaces. A first user, such as user Sam, and/or a first client device 500 associated with the first user may access and/or interact with a communication system for sending and/or receiving emails. For example, a first email account (and/or a different type of user account) of the first user with the communication system may be accessed and/or interacted with via a first email interface, such as an email client, a web email interface accessed via a browser, an email application, etc. on the first client device 500. In some examples, the communication system (and/or the first email interface) may be associated with an email service provider.

In some examples, a first email 518 (illustrated in FIG. 5C) received by the first email account may be identified. For example, the first email 518 may be transmitted by a second email account associated with a first entity (e.g., a company, a business, an organization, etc.). The first email 518 may be associated with a first entity action corresponding to the first entity. For example, the first email 518 may comprise a bill for services and/or the first entity may be a service provider (e.g., an internet service provider "Internet Central"). The bill for services may correspond to a request for payment in exchange for services and/or products (e.g., internet services and/or internet products) provided by the first entity. Accordingly, the first entity action may correspond to transferring a payment to an account (e.g., a bank account) associate with the first entity.

Figure 5A:
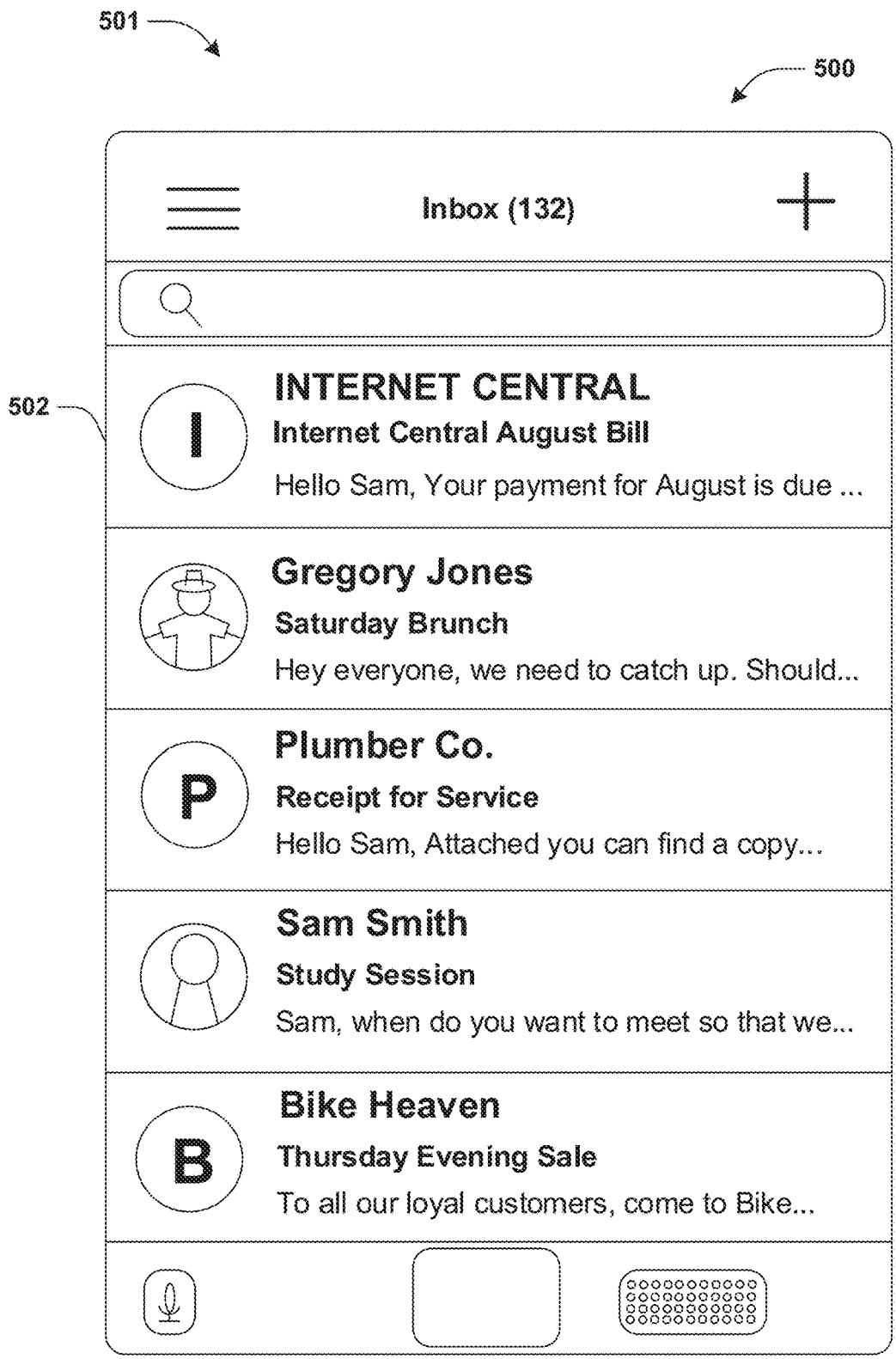
FIG. 5A is a component block diagram illustrating an example system for performing entity actions based upon inputs received via email interfaces, where a graphical user interface of a first client device is controlled to display a first email interface.

FIG. 5A illustrates a graphical user interface of the first client device 500 being controlled to display the first email interface. For example, the first email interface may comprise a list of emails. For example, the list of emails may comprise a first list item 502 corresponding to the first email 518. In some examples, a request to open the first email 518 may be received via a selection of the first list item 502. In some examples, responsive to receiving the request to open the first email 518, a verification process may be performed.

Figure 5B:
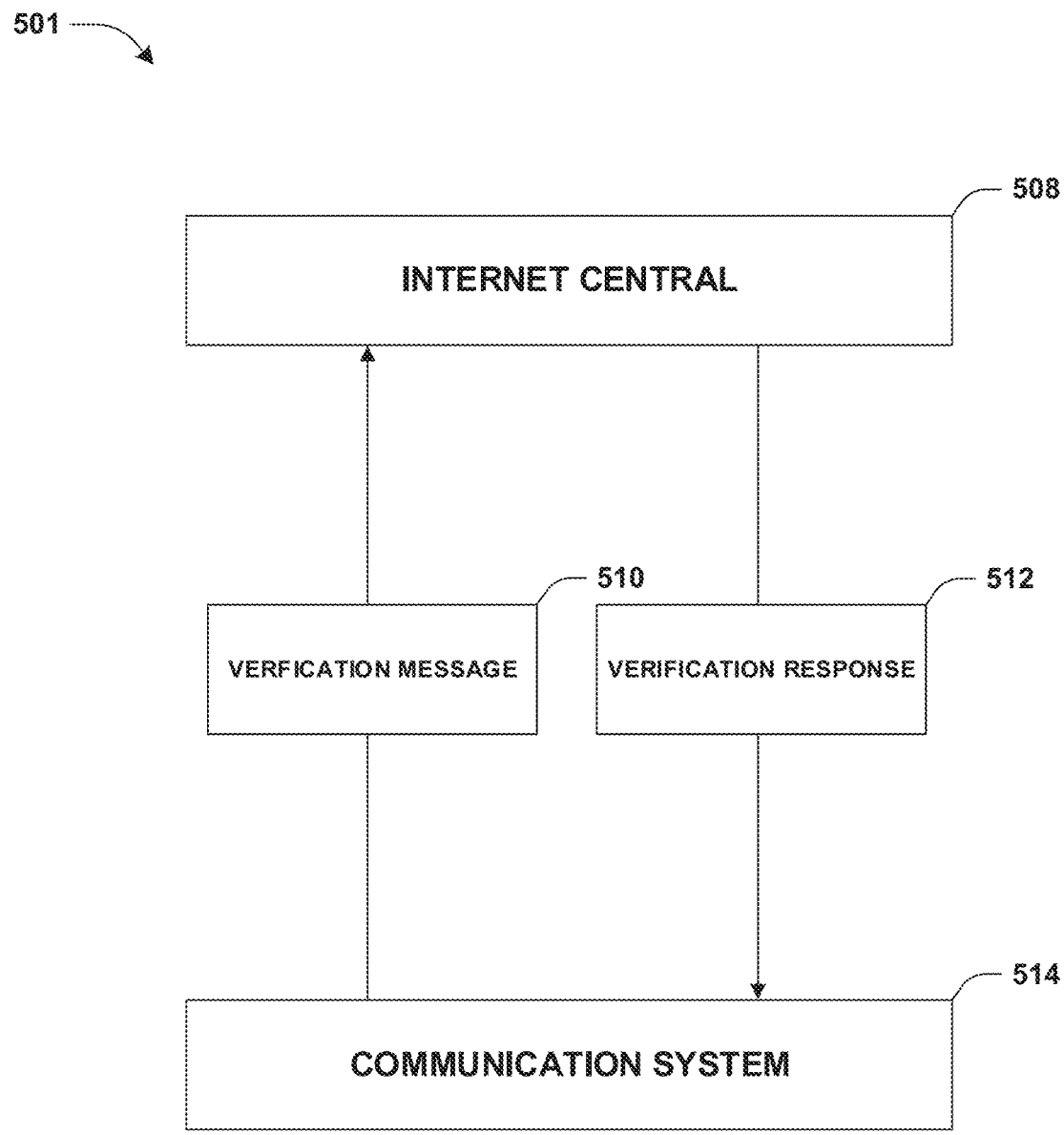
FIG. 5B is a component block diagram illustrating an example system for performing entity actions based upon inputs received via email interfaces, where a verification process is performed.

FIG. 5B illustrates the verification process being performed. For example, the verification process may be performed to verify that the first user associated with the first email account is authorized to perform the first entity action. The first verification process may be performed using a first server 508 associated with the first entity and/or a second server 514 associated with the communication system.

In some examples, the second server 514 associated with the communication system may transmit a first verification message 510 to the first server 508 associated with the first entity. The first verification message 510 may comprise a first token used for authentication processes. In some examples, the first token may have been previously provided by the first server 508 (and/or a different server associated with the first entity) to the second server 514 (and/or a different server associated with the communication system) to be used for authentication and/or verification processes. Alternatively and/or additionally, the first verification message 510 may comprise an indication of a first email address associated with the first email account.

Alternatively and/or additionally, the first server 508 may transmit a second verification message 512 to the second server 514. For example, the second verification message 512 may correspond to a verification response associated with the first verification message 510. For example, the second verification message 512 may be indicative of the first email account and/or the first user being authorized to perform the first entity action. In some examples, responsive to a determination that the first email account and/or the first user are authorized to perform the first entity action, the first email 518, a first selectable input 522 and/or a second selectable input 524 may be displayed using the first email interface.

Figure 5C:
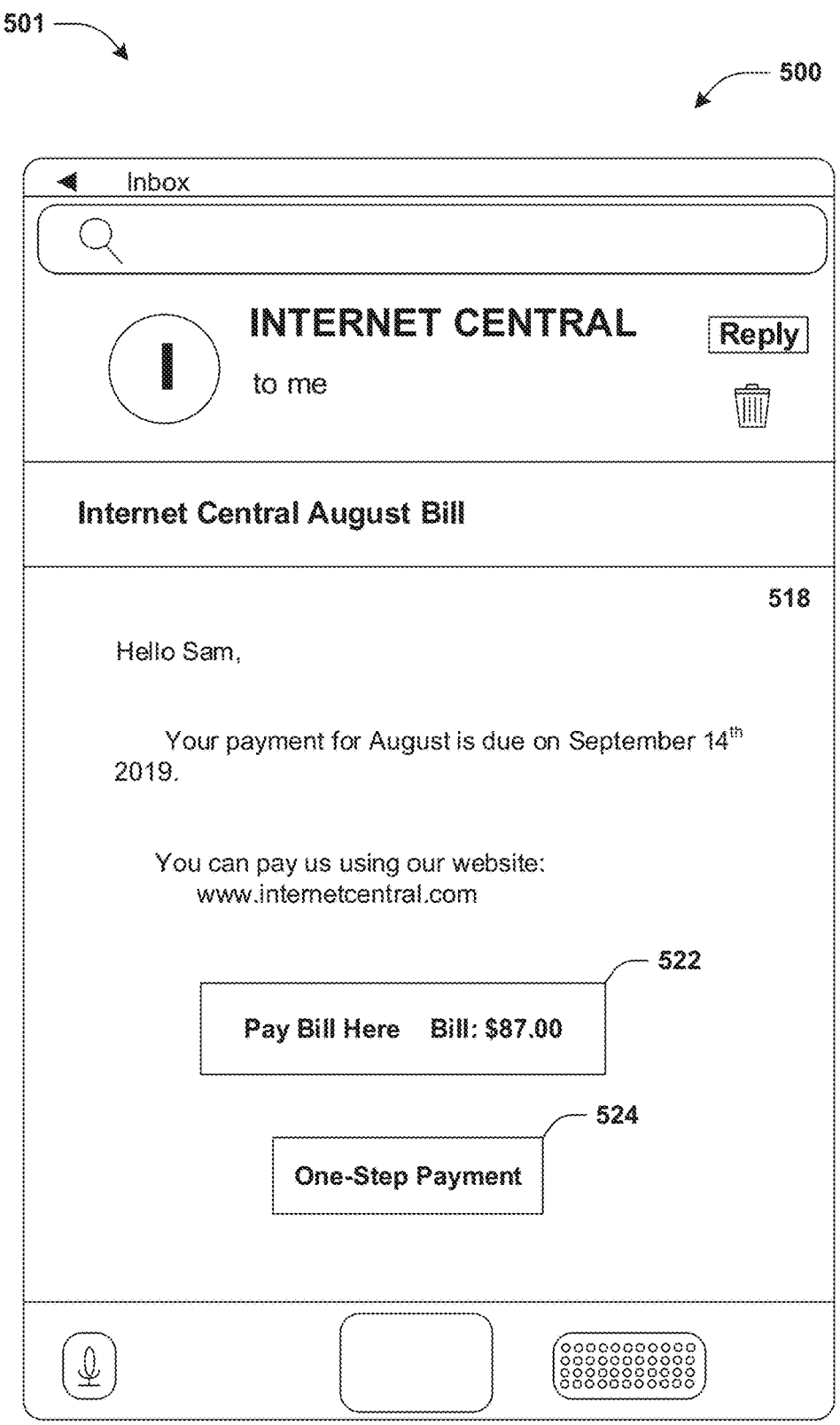
FIG. 5C is a component block diagram illustrating an example system for performing entity actions based upon inputs received via email interfaces, where a graphical user interface of a first client device is controlled to display a first email, a first selectable input and/or a second selectable input.

FIG. 5C illustrates the graphical user interface of the first client device 500 being controlled to display the first email 518, the first selectable input 522 and/or the second selectable input 524. For example, the first selectable input 522 may correspond to performing the first entity action within the first email interface. Alternatively and/or additionally, the second selectable input 524 may correspond to performing the first entity action automatically (e.g., the first entity action may be performed without opening and/or using an action interface, such as action interface 530 illustrated in FIG. 5D). For example, responsive to a selection of the second selectable input 524, the second server 514 (and/or a different server associated with the communication system) may perform the first entity action. Alternatively and/or additionally, responsive to a selection of the second selectable input 524, an automatic action message may be transmitted to the first server 508 (and/or a different server associated with the first entity) and/or the first entity action may be performed by one or more servers associated with the first entity.

In some examples, the first selectable input 522 may comprise a first action message comprising an indication of a payment amount associated with the bill for services (e.g., "Bill: $87.00"). The first action message may be generated based upon action information, received from the first server 508, associated with the first entity action. In some examples, a selection of the first selectable input 522 may be received.

Figure 5D:
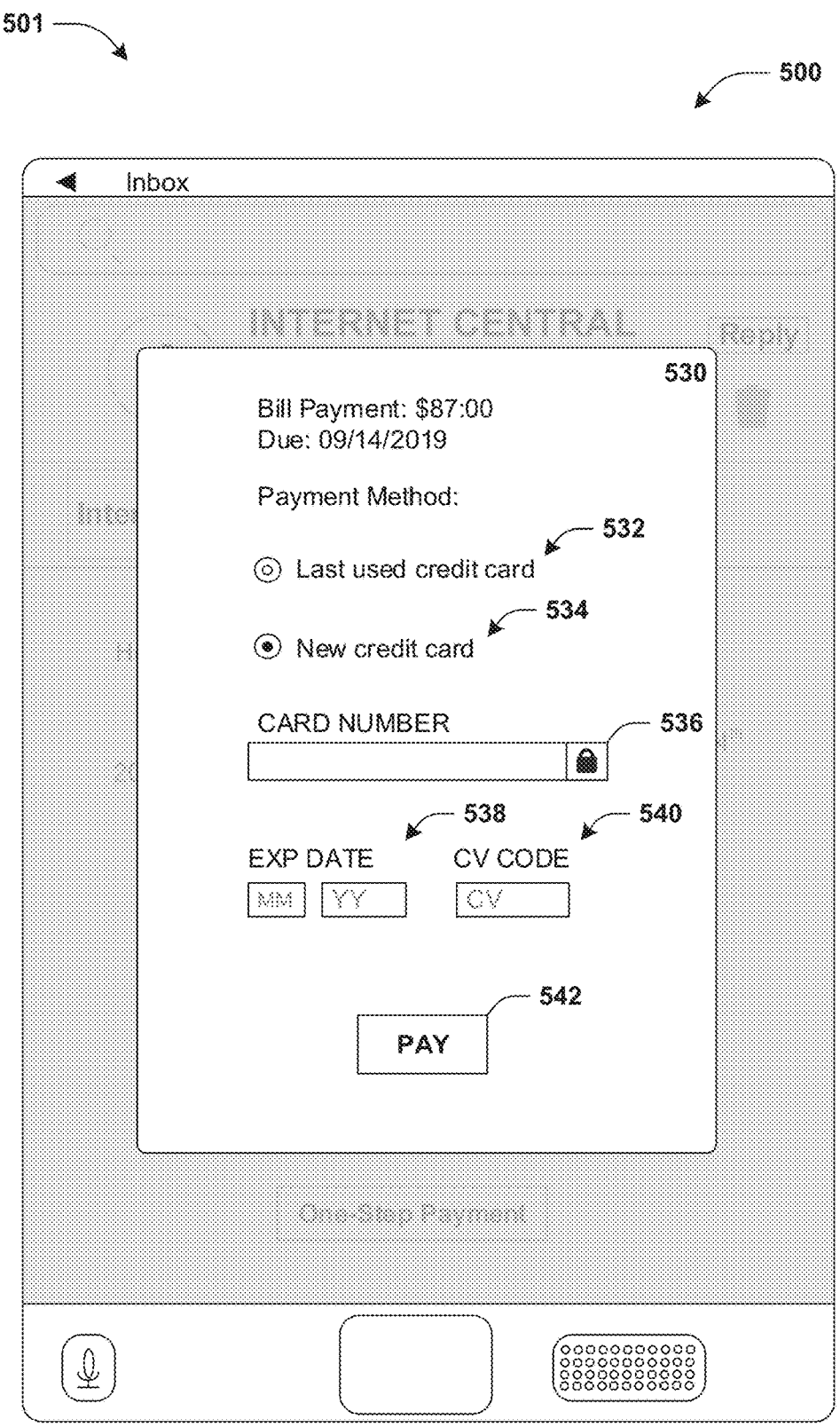
FIG. 5D is a component block diagram illustrating an example system for performing entity actions based upon inputs received via email interfaces, where a graphical user interface of a first client device is controlled to display an action interface.

FIG. 5D illustrates the graphical user interface of the first client device 500 being controlled to display an action interface 530. For example, the action interface 530 may be displayed responsive to receiving a request to perform the first entity action via the selection of the first selectable input 522. In some examples, the action interface 530 may be displayed using the first email interface. For example, the action interface 530 may be overlaid onto the first email 518. In some examples, the action interface 530 may comprise a second action message comprising an indication of the payment amount and/or an indication of a due date associated with the bill for services (e.g., "Bill Payment: $87.00 Due: 09/14/2019").

In some examples, the action interface 530 may comprise a third selectable input 532 corresponding to using a previously used method of payment that the first user previously used to transfer a payment, a fourth selectable input 534 corresponding to using a different method of payment than the previously used method of payment, a first text field 536 corresponding to a credit card number of a credit card, a second set of text fields 538 corresponding to an expiration date of the credit card and/or a third text field 538 corresponding to a security code associated with the credit card. Alternatively and/or additionally, the action interface 530 may comprise a fifth selectable input 542 corresponding to transmitting information inputted and/or selected via the action interface 530 to the second server 514 associated with the communication system.

In some examples, a selection of the fifth selectable input 542 may be received. Responsive to a selection of the fifth selectable input 542, one or more inputs (e.g., the credit card number, the expiration date of the credit card and/or the security code) may be received from the first client device 500. For example, a set of payment information 554 (illustrated in FIG. 5E) may be generated based upon the one or more inputs. For example, the set of payment information 554 may comprise indications of the payment amount, the credit card number, the expiration date of the credit card and/or the security code.

Figure 5E:
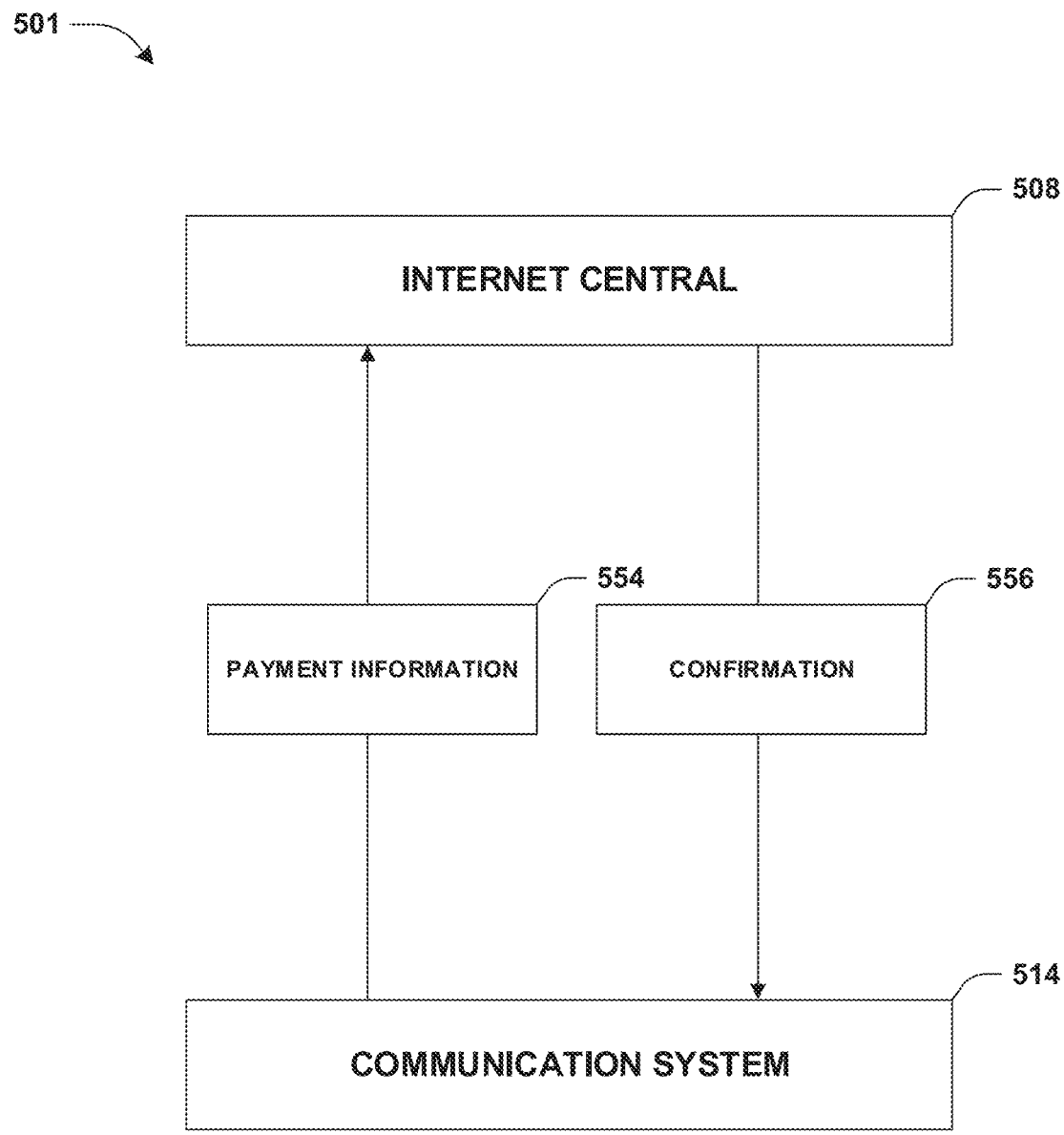
FIG. 5E is a component block diagram illustrating an example system for performing entity actions based upon inputs received via email interfaces, where a second server associated with a communication system transmits a set of payment information to a first server associated with a first entity.

FIG. 5E illustrates the second server 514 associated with the communication system transmitting the set of payment information 554 to the first server 508 associated with the first entity. For example, the set of payment information 554 may be used to transfer a payment to a bank account associated with the first entity. In some examples, the first server 508 associated with the first entity may transmit a payment confirmation message 556 to the second server 514 associated with the communication system. For example, the payment confirmation message 556 may be indicative of the payment being transferred to the bank account associated with the first entity and/or that the first entity action is performed and/or completed.

Figure 5F:
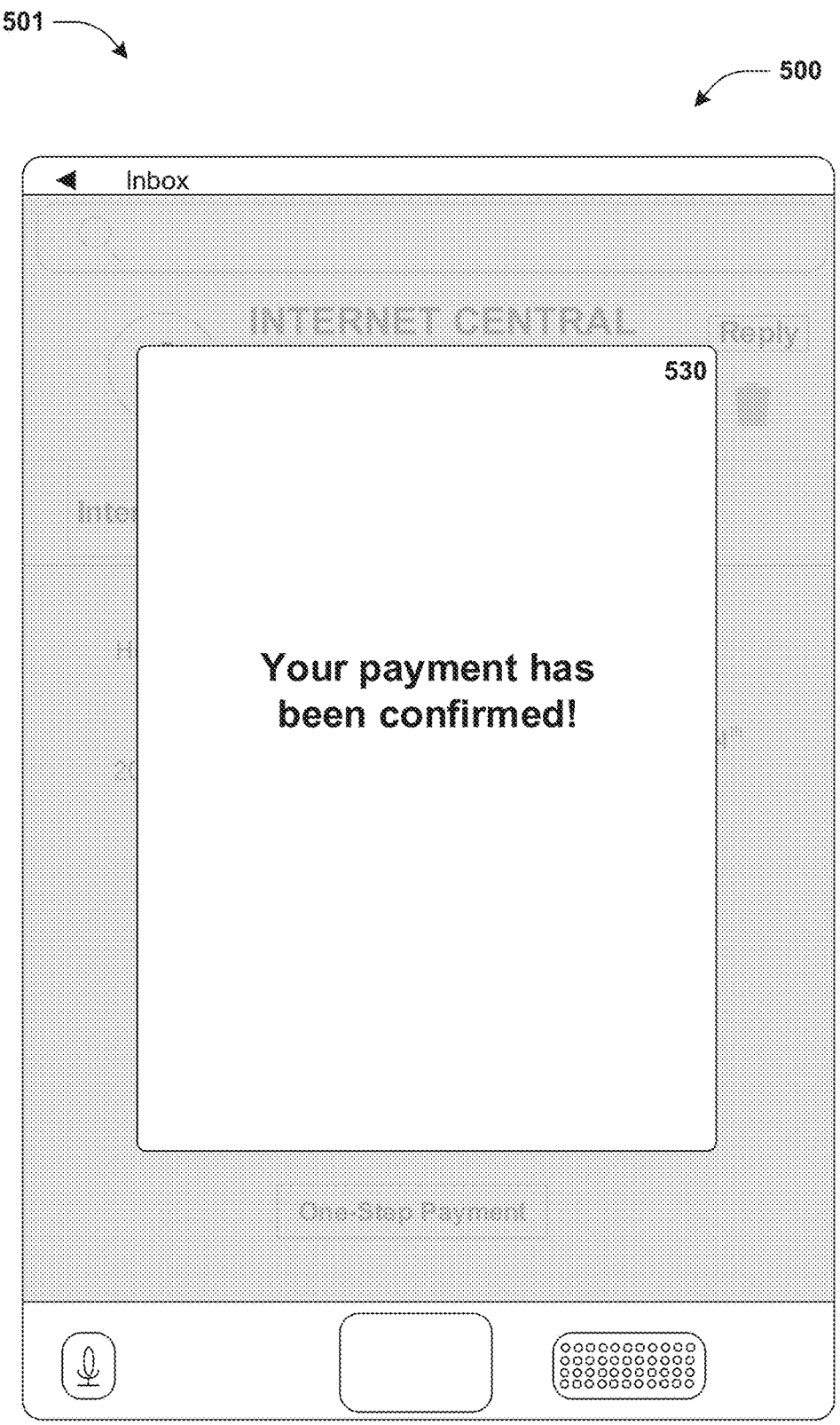
FIG. 5F is a component block diagram illustrating an example system for performing entity actions based upon inputs received via email interfaces, where an action interface displays a confirmation message.

FIG. 5F illustrates the action interface 530 displaying a confirmation message. For example, the confirmation message may be displayed responsive to determining that the first entity action is performed and/or completed. Alternatively and/or additionally, the confirmation message may be displayed responsive to (the second server 514) receiving the payment confirmation message 556.

FIGS. 6A-6E illustrate examples of a system 601 for performing entity actions based upon inputs received via email interfaces. A first user, such as user Sam, and/or a first client device 600 (illustrated in FIG. 6B) associated with the first user may access and/or interact with a communication system for sending and/or receiving emails and/or performing communications via messaging, voice calls, video calls, etc. For example, a first email account (and/or a different type of user account) of the first user with the communication system may be accessed and/or interacted with via a first email interface, such as an email client, a web email interface accessed via a browser, an email application, etc. on the first client device 600. In some examples, the communication system (and/or the first email interface) may be associated with an email service provider.

In some examples, a first email received by the first email account may be identified. For example, the first email may be transmitted by a second email account associated with a first entity (e.g., a company, a business, an organization, etc.). The first email may be associated with a first entity action corresponding to the first entity. For example, the first email may be associated with a flight check-in and/or the first entity may be an airline company (e.g., "Jake Airline"). The flight check-in may be associated with a request to confirm a flight reserved by the first user. Accordingly, the first entity action may correspond to performing the flight check-in.

In some examples, a request to access the first email account may be received from the first client device 600. For example, the request to access the first email account may be received responsive to the first email interface being opened using the first client device 600. Alternatively and/or additionally, the request to access the first email account may be associated with logging into the first email account using the first email interface. In some examples, responsive to receiving the request to access the first email account, a verification process may be performed.

Figure 6A:
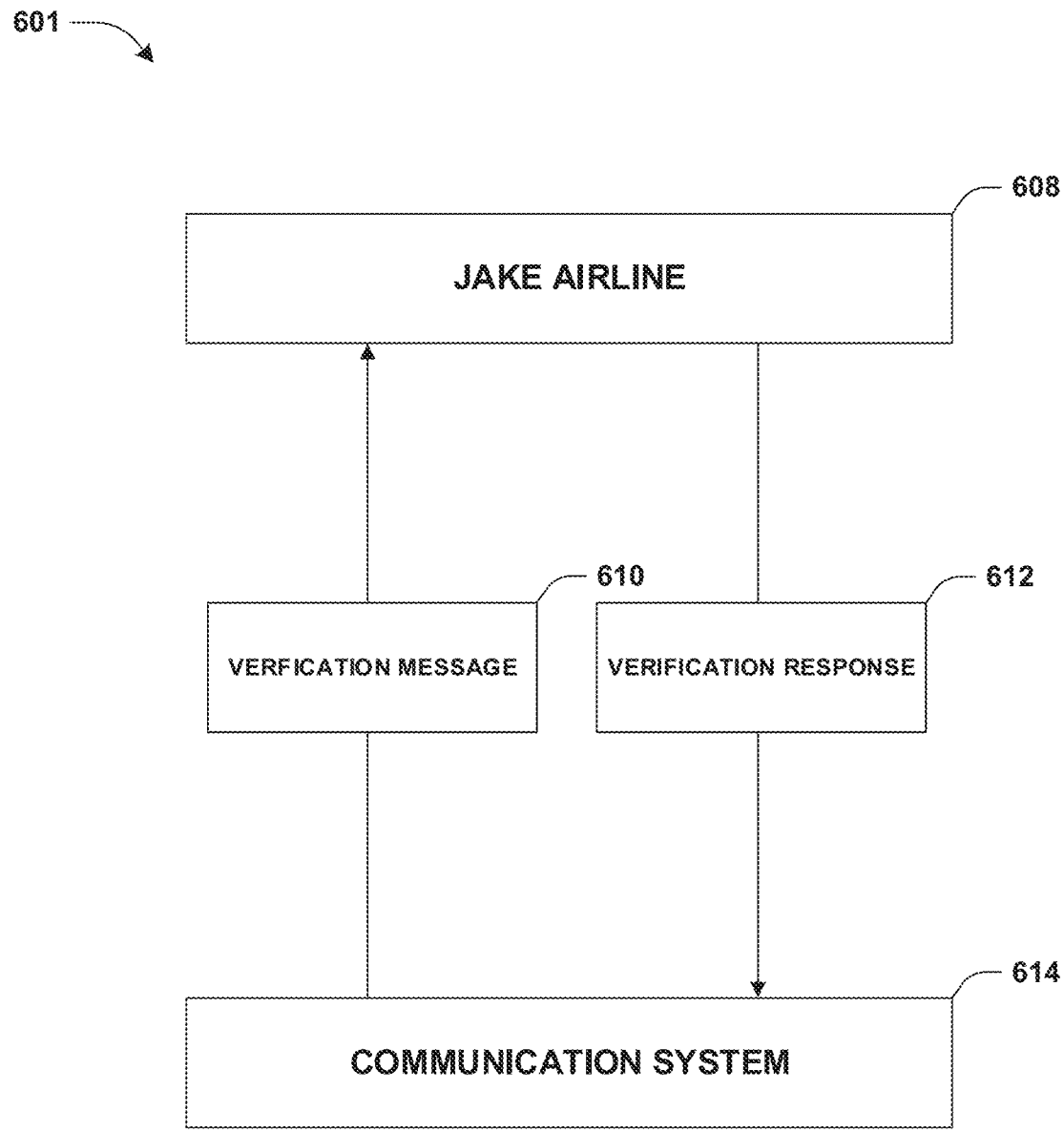
FIG. 6A is a component block diagram illustrating an example system for performing entity actions based upon inputs received via email interfaces, where a verification process is performed.

FIG. 6A illustrates the verification process being performed. For example, the verification process may be performed to verify that the first user associated with the first email account is authorized to perform the first entity action. The first verification process may be performed using a first server 608 associated with the first entity and/or a second server 614 associated with the communication system.

In some examples, the second server 614 associated with the communication system may transmit a first verification message 610 to the first server 608 associated with the first entity. The first verification message 610 may comprise a first token used for authentication processes. Alternatively and/or additionally, the first verification message 610 may comprise an indication of a first email address associated with the first email account.

Alternatively and/or additionally, the first server 608 may transmit a second verification message 612 to the second server 614. For example, the second verification message 612 may correspond to a verification response associated with the first verification message 610. For example, the second verification message 612 may be indicative of the first email account and/or the first user being authorized to perform the first entity action. In some examples, responsive to a determination that the first email account and/or the first user are authorized to perform the first entity action, a list of emails and/or a first selectable input 604 may be displayed.

Figure 6B:
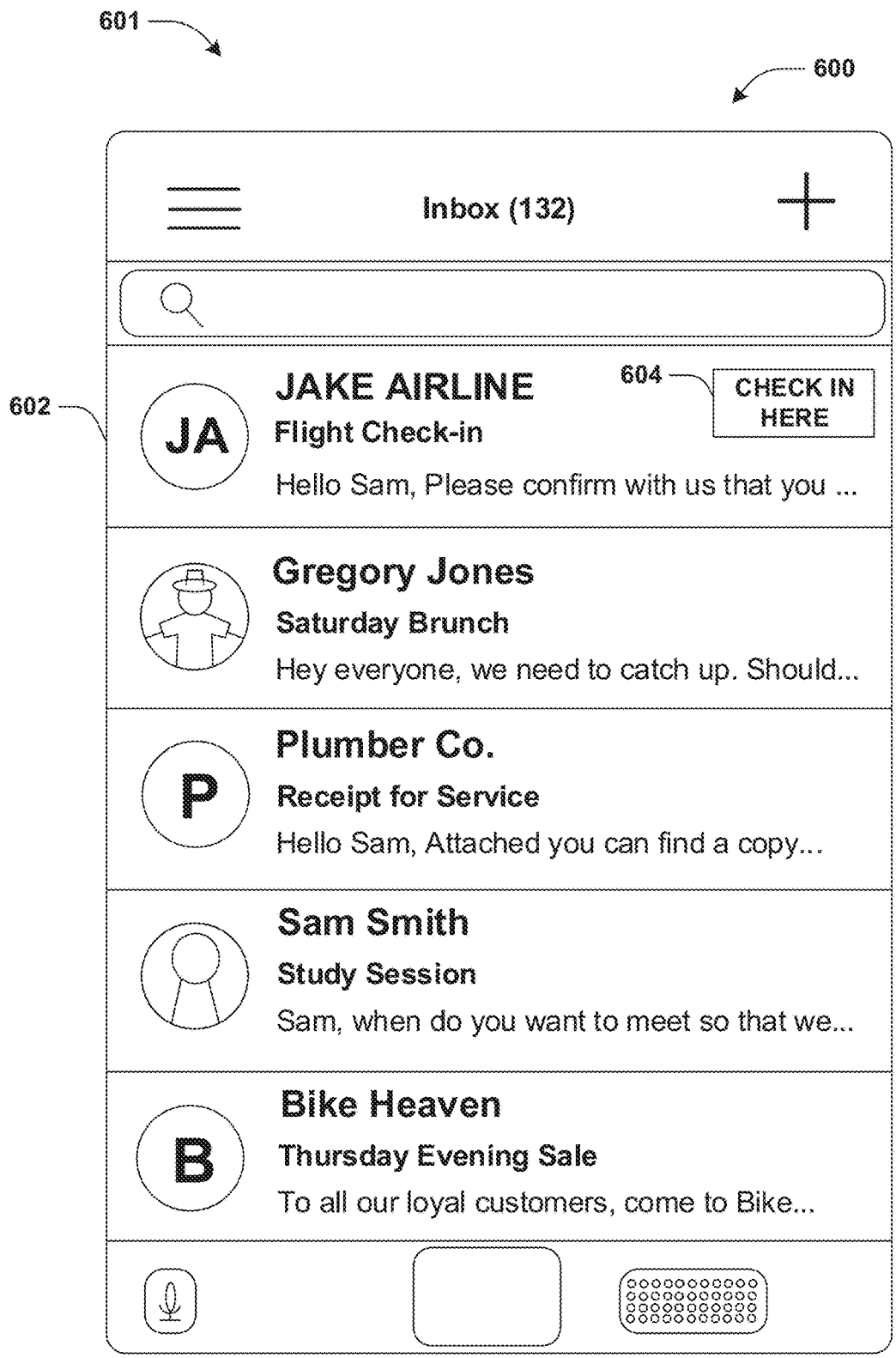
FIG. 6B is a component block diagram illustrating an example system for performing entity actions based upon inputs received via email interfaces, where a graphical user interface of a first client device is controlled to display a first email interface.

FIG. 6B illustrates a graphical user interface of the first client device 600 being controlled to display the first email interface. For example, the first email interface may comprise the list of emails. For example, the list of emails may comprise a first list item 602 corresponding to the first email. In some examples, the first selectable input 604 may correspond to performing the first entity action within the first email interface. Alternatively and/or additionally, the first selectable input 604 may be displayed in association with the first list item 602 of the list of emails. For example, the first selectable input 604 may be displayed within the first list item 602 of the list of emails. In some examples, a selection of the first selectable input 604 may be received.

Figure 6C:
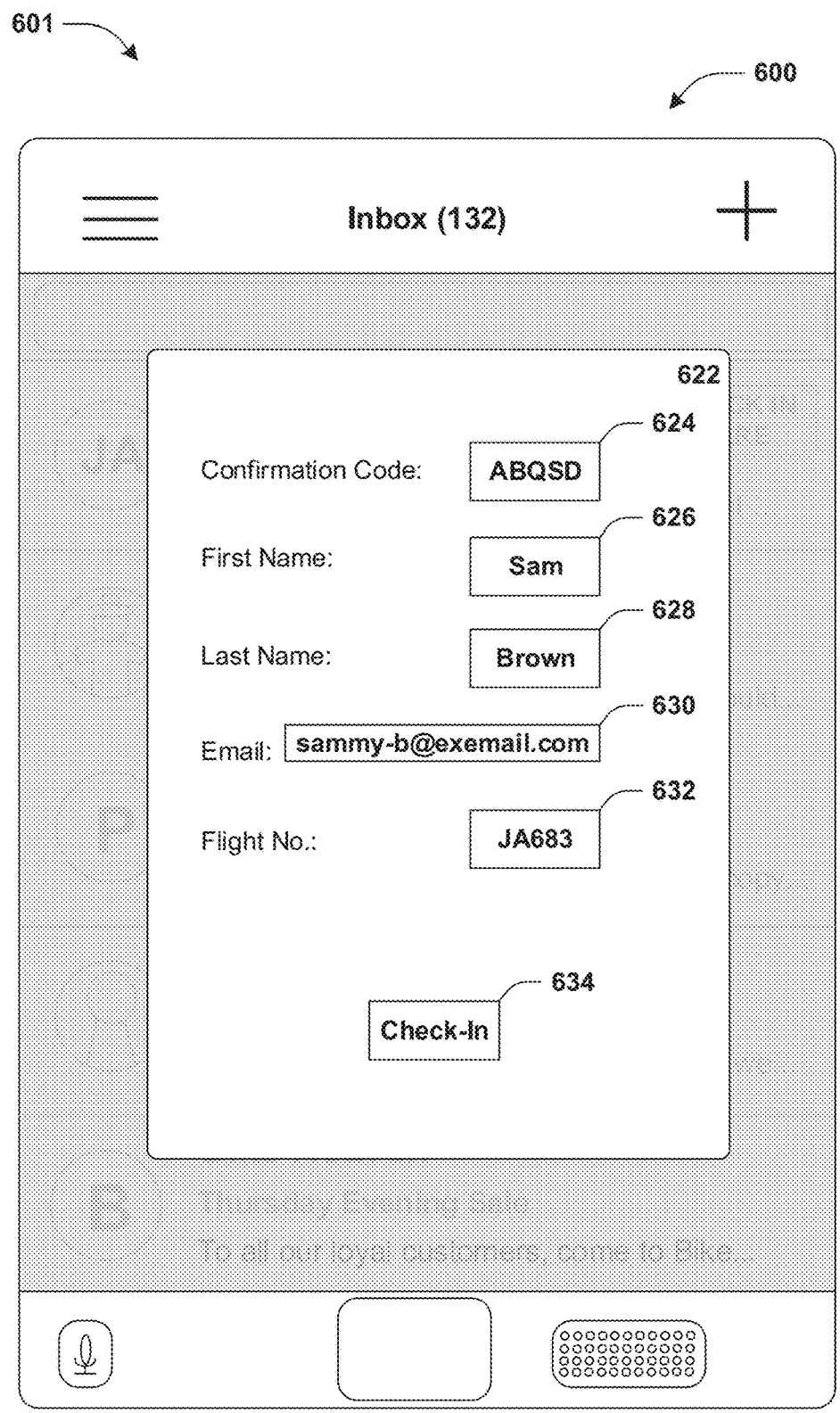
FIG. 6C is a component block diagram illustrating an example system for performing entity actions based upon inputs received via email interfaces, where a graphical user interface of a first client device is controlled to display an action interface.

FIG. 6C illustrates the graphical user interface of the first client device 600 being controlled to display an action interface 622. For example, the action interface 622 may be displayed responsive to receiving a request to perform the first entity action via the selection of the first selectable input 604. In some examples, the action interface 622 may be displayed using the first email interface. For example, the action interface 622 may be overlaid onto the list of emails.

In some examples, the action interface 622 may comprise a first text field 624 corresponding to a confirmation code associated with the flight. Alternatively and/or additionally, the action interface 622 may comprise a second text field 626 and/or a third text field 628 corresponding to a name of the first user. Alternatively and/or additionally, the action interface 622 may comprise a fourth text field 630 corresponding to the email address of the first email account. Alternatively and/or additionally, the action interface 622 may comprise a fifth text field 632 corresponding a flight number of the flight. In some examples, the first text field 624, the second text field 626, the third text field 628, the fourth text field 630 and/or the fifth text field 632 may be pre-filled automatically by analyzing the first email, action information received from the first server 608 and/or other emails associated with the first email account to determine the confirmation code, the name of the first user, the email address of the first email account and/or the flight number of the flight.

Alternatively and/or additionally, the action interface 622 may comprise a second selectable input 634 corresponding to transmitting information inputted into the action interface 622 to the second server 614 associated with the communication system. In some examples, a selection of the second selectable input 634 may be received. Responsive to a selection of the second selectable input 634, one or more inputs (e.g., the confirmation code, the name of the first user, the email address of the first email account and/or the flight number of the flight) may be received from the first client device 600. For example, a set of check-in information 642 (illustrated in FIG. 6D) may be generated based upon the one or more inputs. For example, the set of check-in information 642 may comprise indications of the confirmation code, the name of the first user, the email address of the first email account and/or the flight number of the flight.

Figure 6D:
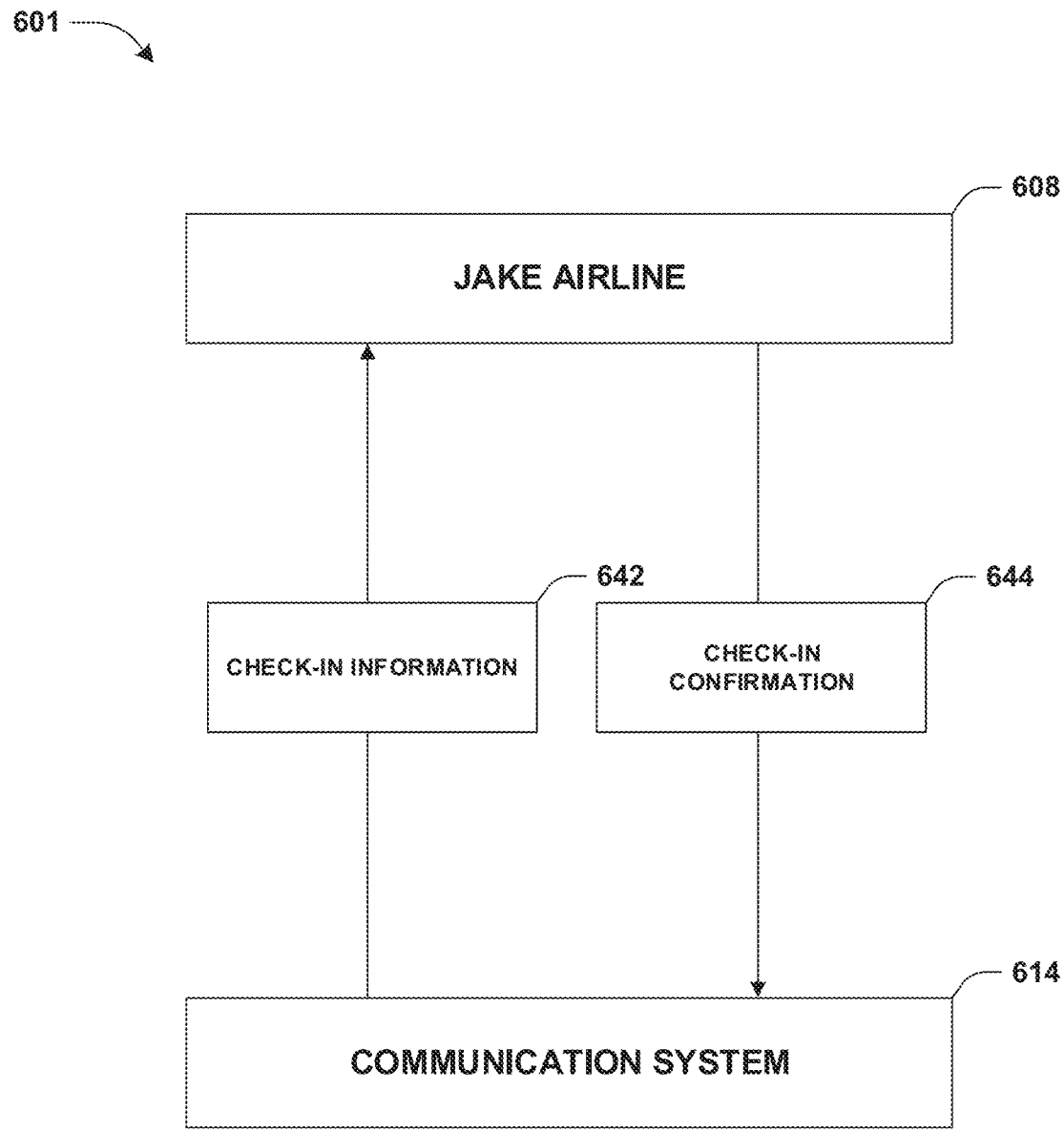
FIG. 6D is a component block diagram illustrating an example system for performing entity actions based upon inputs received via email interfaces, where a second server associated with a communication system transmits a set of check-in information to a first server associated with a first entity.

FIG. 6D illustrates the second server 614 associated with the communication system transmitting the set of check-in information 642 to the first server 608 associated with the first entity. For example, the set of check-in information 642 may be used to perform the flight check-in and/or generate a boarding pass for the first user. In some examples, the first server 608 associated with the first entity may transmit a flight check-in confirmation message 644 to the second server 614 associated with the communication system. For example, the flight check-in confirmation message 644 may be indicative of the flight check-in being performed. In some examples, the flight check-in confirmation message 644 may comprise the boarding pass.

Figure 6E:
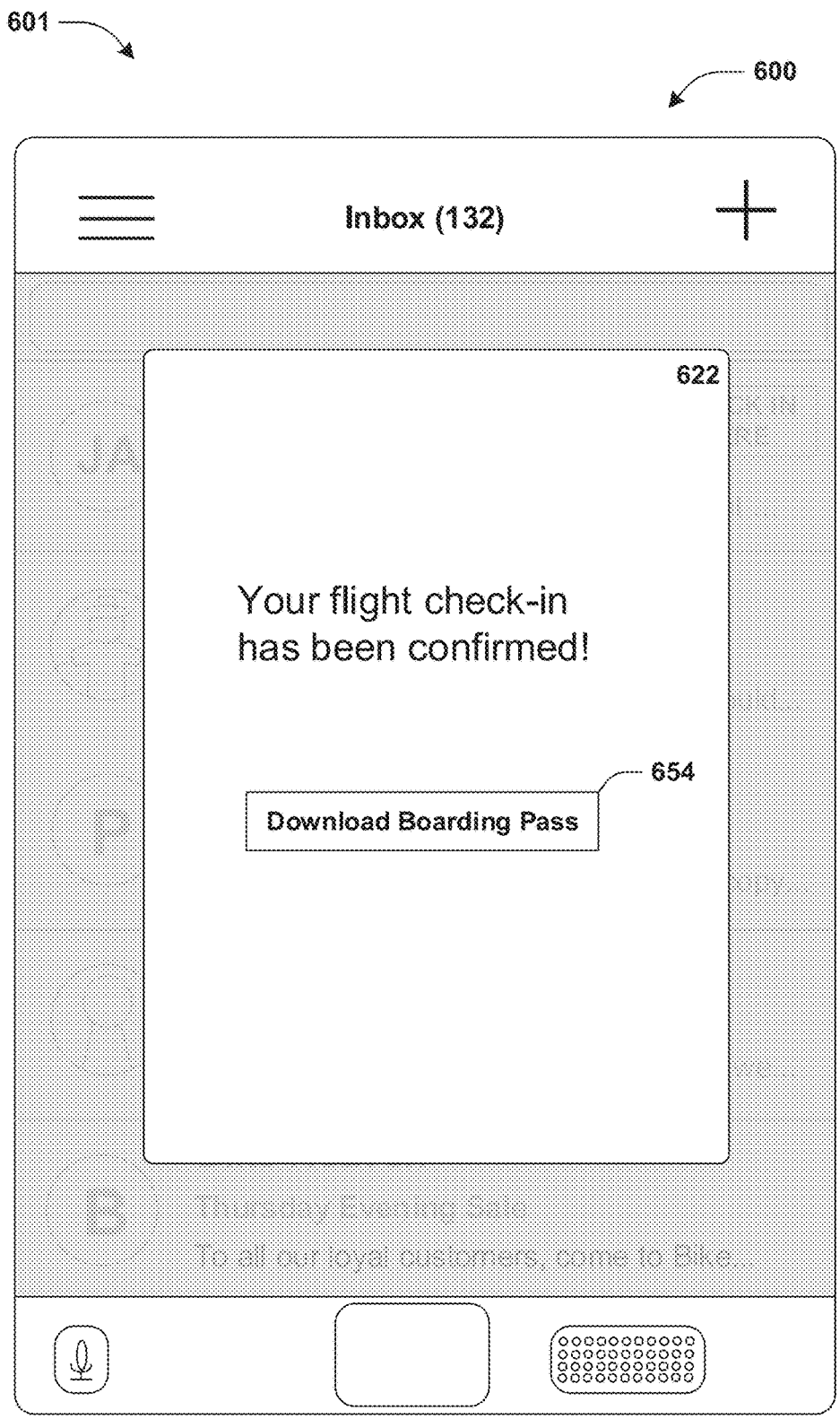
FIG. 6E is a component block diagram illustrating an example system for performing entity actions based upon inputs received via email interfaces, where an action interface displays a confirmation message.

FIG. 6E illustrates the action interface 622 displaying a confirmation message. For example, the confirmation message may be displayed responsive to determining that the first entity action is performed and/or completed. Alternatively and/or additionally, the confirmation message may be displayed responsive to (the second server 614) receiving the flight check-in confirmation message 644. Alternatively and/or additionally, the action interface 622 may display a third selectable input 654 corresponding to downloading and/or printing the boarding pass.

It may be appreciated that the disclosed subject matter may assist a user (e.g., and/or a client device associated with the user) in performing entity actions, such as paying bills, paying taxes, performing flight check-ins, etc. without having to switch interfaces.

Implementation of at least some of the disclosed subject matter may lead to benefits including, but not limited to, a reduction in screen space and/or an improved usability of a display (of the client device) (e.g., as a result of identifying emails that are associated with entity actions, as a result of automatically performing verification processes in association with entities corresponding to the entity actions, as a result of displaying selectable inputs corresponding to performing the entity actions within an email interface, wherein the user may not need to open a separate application and/or a separate window in order to perform the entity actions, etc.).

Alternatively and/or additionally, implementation of at least some of the disclosed subject matter may lead to benefits including a reduction in screen space and/or an improved usability of the display (e.g., as a result of displaying an action interface corresponding to an entity action, as a result of pre-filling text fields and/or auto-selecting selectable inputs of the action interface based upon emails, action information, etc. such that the user does not need to manually fill the text fields and/or manually perform selections of selectable inputs, etc.).

Alternatively and/or additionally, implementation of at least some of the disclosed subject matter may lead to benefits including a reduction in bandwidth (e.g., as a result of reducing a need for the user to open a separate application and/or a separate window to navigate through one or more separate web pages in order to perform the entity action).

In some examples, at least some of the disclosed subject matter may be implemented on a client device, and in some examples, at least some of the disclosed subject matter may be implemented on a server (e.g., hosting a service accessible via a network, such as the Internet).

Figure 7:
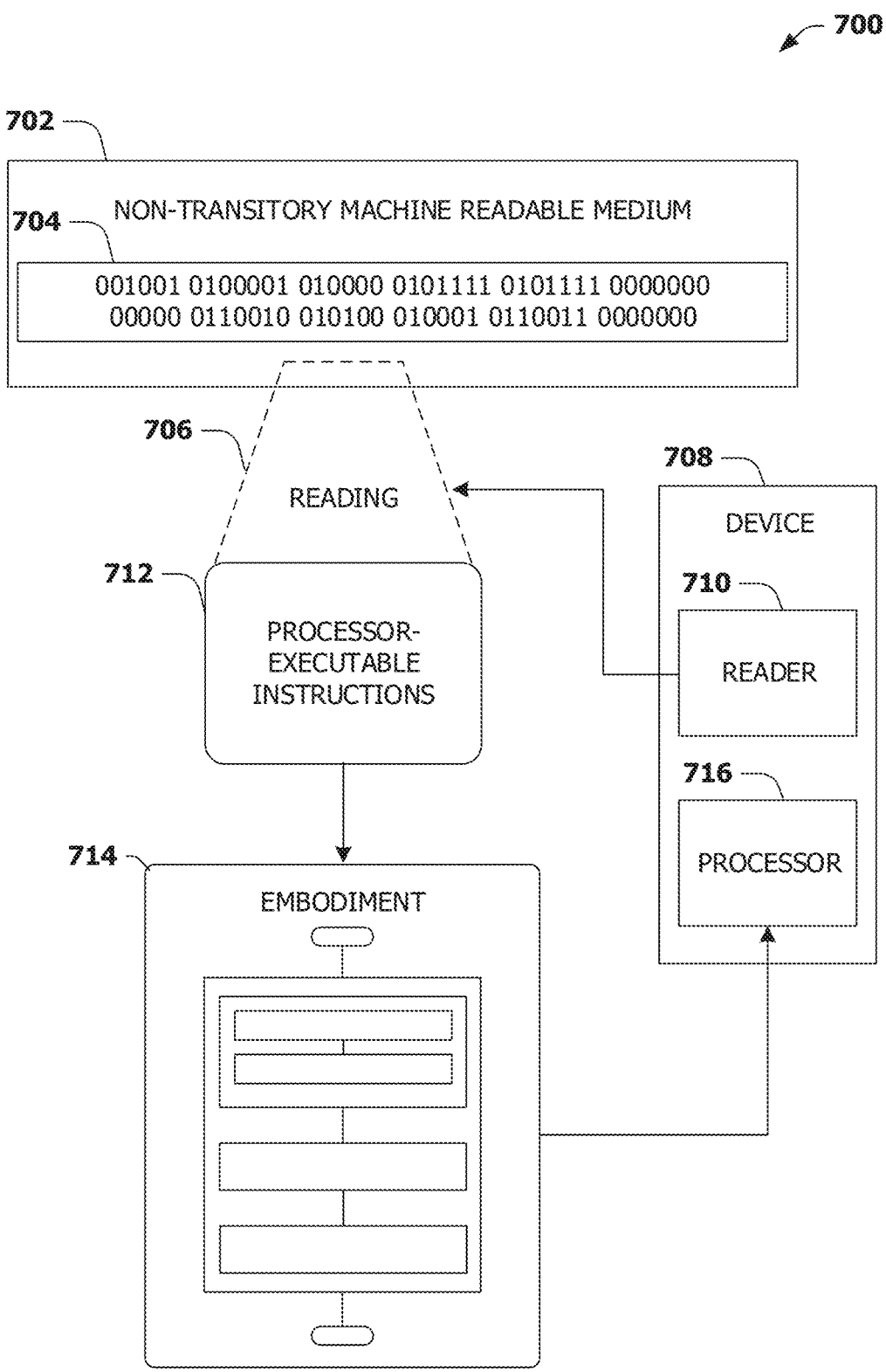
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4, for example. In some embodiments, the processor-executable instructions 712 are configured to cause implementation of a system, such as at least some of the example system 501 of FIGS. 5A-5F, and/or the example system 601 of FIGS. 6A-6E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising: receiving, by a communication system, a plurality of emails from one or more servers of one or more service providers into a first email account of a first user;
   identifying, by the communication system, one or more keywords associated with one or more payments to the one or more service providers by analyzing each email of the plurality of emails;
   based upon the analysis, generating, by the communication system, a list of emails of the plurality of emails, wherein the list of emails comprises a first portion of emails that are each indicative of a payment to a service provider and a second portion of emails that are not each indicative of a payment to a service provider;
   displaying, by the communication system, a first graphical user interface (GUI) on a first device of the first user;
   receiving, by the communication system and via the first GUI, a request from the first user to access the first email account, wherein the request comprises an email address;
   verifying, by the communication system, that the first user is authorized to access the first email account based upon the received email address;
   based upon the verification, generating, by the communication system, an instance of a first selectable input for each email of the first portion of emails;
   displaying, by the communication system and in the first GUI, the list of emails with an instance of the first selectable input for each email of the first portion of emails;
   receiving, by the communication system, a selection of one selectable input, of the first selectable inputs, displayed for a first email of the first portion of emails;
   transmitting, by the communication system, a biometric of the user to a server associated with a first service provider from which the first email, associated with the selected first selectable input, was received;
   receiving, by the communication system, a verification of the biometric from the server;
   displaying, by the communication system and based upon the received verification of the biometric, a second GUI, within the first GUI, comprising a payment amount and a second selectable input for performing a payment to the first service provider from which the first email was received;
   receiving, from the user, by the communication system and via the second GUI, payment information and a selection of the second selectable input;
   responsive to receiving the selection of the second selectable input, transmitting, by the communication system, the payment information to a second server of the first service provider from which the first email, associated with the selected first selectable input, was received;
   receiving, by the communication system, a confirmation from the second server; and
   displaying, by the communication system, the confirmation in the second GUI.

2. The method of claim 1, comprising:
   receiving, by the communication system, the biometric of the first user.

3. The method of claim 1, wherein the list of emails displayed in the first GUI does not comprise an instance of the first selectable input for each email of the second portion of emails.

4. The method of claim 1, wherein the server associated with the first service provider is different than the second server of the first service provider.

5. The method of claim 1, wherein the request comprises a password.

6. The method of claim 1, wherein the server associated with the first service provider is the same as the second server of the first service provider.

7. The method of claim 2, wherein the receiving the biometric comprises receiving a fingerprint of the first user.

8. The method of claim 2, wherein the receiving the biometric comprises receiving an eye scan of the first user.

9. The method of claim 2, wherein the receiving the biometric comprises receiving an audio recording of a voice of the first user.

10. The method of claim 1, comprising:
    pre-filling, by the communication system, one or more text fields of the second GUI.

11. The method of claim 1, comprising:
    determining, by the communication system, that the first user is authorized to perform the payment to the first service provider based upon the verification of the biometric.

12. The method of claim 1, comprising:
    auto-selecting, by the communication system, one or more selectable inputs of the second GUI.

13. A communication system comprising:
    a processor; and
    memory comprising processor-executable instructions that, when executed by the processor, causes the processor to perform operations, the operations comprising:
    receiving a plurality of emails from one or more servers of one or more service providers into a first email account of a first user;
    identifying one or more keywords associated with one or more payments to the one or more service providers by analyzing each email of the plurality of emails;
    based upon the analysis, generating a list of emails of the plurality of emails, wherein the list of emails comprises a first portion of emails that are each indicative of a payment to a service provider and a second portion of emails that are not each indicative of a payment to a service provider;
    displaying a first graphical user interface (GUI) on a first device of the first user;
    receiving, via the first GUI, a request from the first user to access the first email account, wherein the request comprises an email address;
    verifying that the first user is authorized to access the first email account based upon the received email address;
    based upon the verification, generating an instance of a first selectable input for each email of the first portion of emails;
    displaying, in the first GUI, the list of emails with an instance of the first selectable input for each email of the first portion of emails;

receiving a selection of one selectable input, of the first selectable inputs, displayed for a first email of the first portion of emails;
transmitting a biometric of the user to a server associated with a first service provider from which the first email, associated with the selected first selectable input, was received;
receiving a verification of the biometric from the server;
displaying, based upon the received verification of the biometric, a second GUI, within the first GUI, comprising a payment amount and a second selectable input for performing a payment to the first service provider from which the first email was received;
receiving, from the user and via the second GUI, payment information and a selection of the second selectable input;
responsive to receiving the selection of the second selectable input, transmitting the payment information to a second server of the first service provider from which the first email, associated with the selected first selectable input, was received;
receiving a confirmation from the second server; and
displaying the confirmation in the second GUI.

14. The communication system of claim 13, the operations comprising:
receiving the biometric of the first user.

15. The communication system of claim 13, the operations comprising:
wherein the server associated with the first service provider is different than the second server of the first service provider.

16. The communication system of claim 13, the operations comprising:
wherein the server associated with the first service provider is the same as the second server of the first service provider.

17. A non-transitory machine readable medium having stored thereon processor-executable instructions that, when executed by a processor of a communication system, causes the processor of the communication system to perform operations, the operations comprising:
receiving a plurality of emails from one or more servers of one or more service providers into a first email account of a first user;
identifying one or more keywords associated with one or more payments to the one or more service providers by analyzing each email of the plurality of emails;
based upon the analysis, generating a list of emails of the plurality of emails, wherein the list of emails comprises a first portion of emails that are each indicative of a payment to a service provider and a second portion of emails that are not each indicative of a payment to a service provider;
displaying a first graphical user interface (GUI) on a first device of the first user;
receiving via the first GUI, a request from the first user to access the first email account, wherein the request comprises an email address;
verifying that the first user is authorized to access the first email account based upon the received email address;
based upon the verification, generating an instance of a first selectable input for each email of the first portion of emails;
displaying in the first GUI, the list of emails with an instance of the first selectable input for each email of the first portion of emails;
receiving a selection of one selectable input, of the first selectable inputs, displayed for a first email of the first portion of emails;
transmitting a biometric of the user to a server associated with a first service provider from which the first email, associated with the selected first selectable input, was received;
receiving a verification of the biometric from the server;
displaying based upon the received verification of the biometric, a second GUI, within the first GUI, comprising a payment amount and a second selectable input for performing a payment to the first service provider from which the first email was received;
receiving, from the user, via the second GUI, payment information and a selection of the second selectable input;
responsive to receiving the selection of the second selectable input, transmitting the payment information to a second server of the first service provider from which the first email, associated with the selected first selectable input, was received;
receiving a confirmation from the second server; and
displaying the confirmation in the second GUI.

18. The non-transitory machine readable medium of claim 17, the operations comprising:
receiving the biometric of the first user.

19. The non-transitory machine readable medium of claim 17, wherein the request comprises a password.

20. The non-transitory machine readable medium of claim 17, the operations comprising at least one of:
auto-selecting one or more selectable inputs of the second GUI; or
pre-filling one or more text fields of the second GUI.

\* \* \* \* \*